United States Patent
Hills et al.

(10) Patent No.: US 11,709,816 B2
(45) Date of Patent: Jul. 25, 2023

(54) METHODS AND SYSTEMS FOR DATA STRUCTURE OPTIMIZATION

(71) Applicant: FEDERAL EXPRESS CORPORATION, Memphis, TN (US)

(72) Inventors: Larry Hills, Collierville, TN (US); Ross Armstrong, Collierville, TN (US); Carlos Sosa, Memphis, TN (US)

(73) Assignee: Federal Express Corporation, Memphis, TN (US)

( * ) Notice: Subject to any disclaimer, the term of this patent is extended or adjusted under 35 U.S.C. 154(b) by 43 days.

(21) Appl. No.: 17/100,415

(22) Filed: Nov. 20, 2020

(65) Prior Publication Data

US 2021/0286796 A1    Sep. 16, 2021

Related U.S. Application Data

(63) Continuation of application No. 14/575,654, filed on Dec. 18, 2014, now Pat. No. 10,885,010.

(60) Provisional application No. 61/917,678, filed on Dec. 18, 2013.

(51) Int. Cl.
G06F 16/22    (2019.01)
G06F 16/28    (2019.01)

(52) U.S. Cl.
CPC ........ *G06F 16/2282* (2019.01); *G06F 16/285* (2019.01)

(58) Field of Classification Search
CPC .................. G06F 16/285; G06F 16/2282
See application file for complete search history.

(56) References Cited

U.S. PATENT DOCUMENTS

| | | | |
|---|---|---|---|
| 4,642,775 A | 2/1987 | Cline et al. |
| 4,792,102 A | 12/1988 | Olson |
| 5,359,446 A | 10/1994 | Johnson et al. |
| 5,445,347 A | 8/1995 | Ng |
| 5,557,522 A | 9/1996 | Nakayama et al. |

(Continued)

FOREIGN PATENT DOCUMENTS

| | | |
|---|---|---|
| CA | 2189494 A1 | 5/1997 |
| CA | 2533495 A1 | 5/2005 |

(Continued)

OTHER PUBLICATIONS

Non-Final Office Action dated Jun. 10, 2021 by the USPTO for U.S. Appl. No. 16/053,501, filed Aug. 2, 2018 and published as US 2019-0238553 A1 on Aug. 1, 2019 (Inventor—Mark D. Yerger) (22 Pages).

(Continued)

*Primary Examiner* — Etienne P Leroux
(74) *Attorney, Agent, or Firm* — Ballard Spahr LLP

(57) ABSTRACT

Methods and systems for optimizing a data structure are disclosed. An example method can comprise categorizing, based on travel information associated with a vehicle, locations according to at least one of a first category and a second category. An example method can comprise generating search criteria configured to select first data for locations categorized with the first category and second data for locations categorized with the second category. The first data can be more detailed than the second data. An example method can comprise receiving information based on the search criteria and providing the information to the vehicle.

20 Claims, 17 Drawing Sheets

(56) References Cited

U.S. PATENT DOCUMENTS

| | | | |
|---|---|---|---|
| 5,809,396 A * | 9/1998 | Armbruster | H04B 7/18558 455/12.1 |
| 5,832,408 A | 11/1998 | Tamai et al. | |
| 6,047,165 A | 4/2000 | Wright et al. | |
| 6,104,914 A | 8/2000 | Wright et al. | |
| 6,108,523 A | 8/2000 | Wright et al. | |
| 6,148,179 A | 11/2000 | Wright et al. | |
| 6,154,636 A | 11/2000 | Wright et al. | |
| 6,154,637 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,308,044 B1 | 10/2001 | Wright et al. | |
| 6,308,045 B1 | 10/2001 | Wright et al. | |
| 6,353,734 B1 | 3/2002 | Wright et al. | |
| 6,522,867 B1 | 2/2003 | Wright et al. | |
| 6,745,010 B2 | 6/2004 | Wright et al. | |
| 6,760,778 B1 | 7/2004 | Nelson | |
| 6,775,545 B2 | 8/2004 | Wright et al. | |
| 6,889,137 B1 | 5/2005 | Rychlak | |
| 6,943,699 B2 | 9/2005 | Ziarno | |
| 6,944,533 B2 * | 9/2005 | Kozak | G01C 21/3484 725/74 |
| 6,990,319 B2 | 1/2006 | Wright et al. | |
| 7,149,530 B1 | 12/2006 | Arakawa et al. | |
| RE40,479 E | 9/2008 | Wright et al. | |
| 7,426,387 B2 | 9/2008 | Wright et al. | |
| 7,426,388 B1 | 9/2008 | Wright et al. | |
| 7,428,412 B2 | 9/2008 | Wright et al. | |
| 7,444,146 B1 | 10/2008 | Wright et al. | |
| 7,456,756 B2 | 11/2008 | Ziarno | |
| 7,546,123 B2 | 6/2009 | Wright et al. | |
| 7,584,179 B2 | 9/2009 | Finley et al. | |
| 7,620,374 B2 | 11/2009 | Ziarno et al. | |
| 7,769,376 B2 | 8/2010 | Wright et al. | |
| 8,165,793 B1 | 4/2012 | Pylant | |
| 8,220,038 B1 | 7/2012 | Lucchesi | |
| 8,290,696 B1 | 10/2012 | Sridhar et al. | |
| 8,351,926 B1 | 1/2013 | Wright et al. | |
| 8,351,927 B2 | 1/2013 | Wright et al. | |
| 9,015,152 B1 * | 4/2015 | Schogol | G06F 16/285 707/723 |
| 2002/0018008 A1 | 2/2002 | Wright et al. | |
| 2002/0147733 A1 | 10/2002 | Gold et al. | |
| 2005/0222761 A1 * | 10/2005 | Uyeki | G08G 1/096716 340/995.13 |
| 2006/0020373 A1 | 1/2006 | Abe | |
| 2006/0047715 A1 * | 3/2006 | Parizeau | G06Q 10/087 707/999.203 |
| 2006/0057974 A1 | 3/2006 | Ziarno et al. | |
| 2006/0080451 A1 | 4/2006 | Eckert | |
| 2007/0050108 A1 | 3/2007 | Larschan et al. | |
| 2007/0088467 A1 | 4/2007 | Knotts | |
| 2007/0115938 A1 | 5/2007 | Conzachi | |
| 2007/0118279 A1 * | 5/2007 | Kudo | G01C 21/3679 701/532 |
| 2007/0298739 A1 | 12/2007 | Rao | |
| 2008/0005275 A1 | 1/2008 | Overton et al. | |
| 2008/0072049 A1 | 3/2008 | Cross | |
| 2008/0075912 A1 | 3/2008 | Malinek | |
| 2008/0117757 A1 | 5/2008 | Kim | |
| 2009/0109063 A1 | 4/2009 | Grimshaw et al. | |
| 2009/0138517 A1 | 5/2009 | McLain | |
| 2009/0140887 A1 | 6/2009 | Breed et al. | |
| 2009/0248959 A1 | 10/2009 | Tzeng | |
| 2009/0299566 A1 | 12/2009 | Tanigawa et al. | |
| 2009/0312946 A1 | 12/2009 | Yoshioka et al. | |
| 2010/0318794 A1 | 12/2010 | Dierickx | |
| 2011/0021149 A1 | 1/2011 | Goto et al. | |
| 2011/0144897 A1 | 6/2011 | Dunsky | |
| 2011/0255506 A1 | 10/2011 | Toth | |
| 2012/0022782 A1 | 1/2012 | Laube et al. | |
| 2012/0259722 A1 | 10/2012 | Mikurak | |
| 2012/0272231 A1 | 10/2012 | Kwon et al. | |
| 2012/0303826 A1 | 11/2012 | Nelson et al. | |
| 2013/0036103 A1 | 2/2013 | Lawson et al. | |
| 2013/0104186 A1 | 4/2013 | Dietz | |
| 2013/0247015 A1 | 9/2013 | Abadi | |
| 2014/0136589 A1 | 5/2014 | Wahler | |
| 2014/0325518 A1 | 10/2014 | Kim | |
| 2015/0032979 A1 | 1/2015 | Li et al. | |
| 2016/0086392 A1 | 3/2016 | Ziarno | |
| 2017/0193026 A1 | 7/2017 | Pettovello | |

FOREIGN PATENT DOCUMENTS

| | | |
|---|---|---|
| CN | 1846238 A | 10/2006 |
| EP | 0407179 A1 | 1/1991 |
| EP | 0743580 A1 | 11/1996 |
| EP | 0774724 A2 | 5/1997 |
| EP | 1654715 A2 | 5/2006 |
| EP | 2053480 A2 | 4/2009 |
| JP | 2007516377 A | 6/2007 |
| KR | 20060052868 A | 5/2006 |
| WO | 2007/013878 A2 | 2/2007 |

OTHER PUBLICATIONS

Response to Final Office Action and RCE filed on May 10, 2021 with the USPTO for U.S. Appl. No. 16/052,501 and published as US 2019-0238553 A1 on Aug. 1, 2019 (Inventor—Mark D. Yerger) (13 Pages).

Final rejection dated Dec. 8, 2020 by the USPTO for U.S. Appl. No. 16/053,501, filed Aug. 2, 2018 and published as US 2019-0238553 A1 on Aug. 1, 2019 (Inventor—Mark D. Yerger) (23 Pages).

AEEC Letter 91-079/DLK-391 to AEEC Members dated Apr. 5, 1991, with Attachments (41 pages).

ARINC Letter to ELSARINC Letter to ELS/TG-115 Subcommittee, Avionics Pub. No. 93-203/ELS-74, Sep. 1, 1993 (174 pages).

ARINC Letter to FCM/TG-111, Avionics Pub. No. 94-205/FCM-69, Sep. 1, 1994 (38 pages).

ARINC, "Design Guidance for Onboard Maintenance System" ARINC Characteristic 624-1. published Aug. 30, 1993 (102 pages).

ARINC, "Gate-Aircraft Terminal Environment Link (Gatelink)—Aircraft Side," Characteristic 751, published Jan. 1, 1994 (31 pages).

ARINC, "Gate-Aircraft Terminal Environment Link (Gatelink)—Ground Link," ARINC Specification 632, published Dec. 30, 1994 (30 pages).

ARINC, "Quick Access Recorder for AIDS System (QAR)" ARINC Characteristic 591, published Jul. 26, 1972 (21 pages).

Aviation Week & Space Technology "Conversion Approach Appears Flawed", Jul. 26, 1993, (3 pages).

Aviation Week & Space Technology "Safety Board Urges Mandatory Use Of FDR/CVRs in Commuter Transports", Aug. 31, 1987, (5 pages).

Beckman, "L-1011 Flight Data Recording Systems—Background, Features, Implications and Benefits," AIAA Aircraft Systems and Technology Conference, 1978 (9 pages).

Electronic Engineering Times "Module Is Result Of Work With Apple—Plessey Makes Leap With Wireless LAN", Nov. 7, 1994, (3 pages).

U.S. Appl. No. 16/053,501 2019/0238553, filed Aug. 2, 2018 Aug. 1, 2019, Mark D. Yerger (Federal Express Corporation).

* cited by examiner

DESTINATION (CAT 1)
SIDS
- RNAV
- Conventional

STARS
- RNAV
- Conventional

IAPS
- RNAV (GPS)
- RNAV (RNP)
- ILS
- LOC
- VOR
- NDB

AIRPORT DATA
- Standard

ALTERNATE (CAT 2)
SIDS

STARS
- RNAV

IAPS
- RNAV (GPS)
- RNAV (RNP)
- ILS
- LOC
- VOR
- NDB

AIRPORT DATA
- Standard

EMERGENCY (CAT 4)
SIDS

STARS

IAPS

AIRPORT DATA
- Standard

ICAO REGION DIAGRAM

NO STEP DOWN FIXES

ILS or LOC RWY 27

FAF= FINAL APPR FIX

STEP DOWN FIX

ILS or LOC RWY 27

METHODS AND SYSTEMS FOR DATA STRUCTURE OPTIMIZATION

CROSS REFERENCE TO RELATED PATENT APPLICATION

This application claims priority under 35 U.S.C. § 120 to and is a continuation of U.S. patent application Ser. No. 14/575,654, filed on Dec. 18, 2014, which claims priority to U.S. Provisional Application No. 61/917,678, filed on Dec. 18, 2013, the entire contents of each of which are hereby incorporated herein by reference for all purposes.

SUMMARY

It is to be understood that both the following general description and the following detailed description are exemplary and explanatory only and are not restrictive, as claimed. Provided are methods and systems for optimizing a data structure. An example method can comprise categorizing, based on travel information associated with a vehicle, locations according to at least one of a first category and a second category. Search criteria can be generated. The search criteria can be configured to select first data for locations categorized with the first category and second data for locations categorized with the second category. The first data can be more detailed than the second data. Information can be received based on the search criteria. The information can be provided to the vehicle.

In another aspect, an example method can comprise receiving search criteria configured to select first data for locations associated with a first category and second data for locations associated with a second category. The first data can be more detailed than the second data. The first locations can be associated with the first category based on travel information of the vehicle. The second locations can be associated with the second category based on the travel information of the vehicle. A data structure can be generated based on the search criteria. Access can be provided to the data structure.

In another aspect, an example method can comprise receiving a first data structure associated with a vehicle. A storage size of the first data structure can be compared to a threshold. Search criteria can be identified based on travel information of the vehicle and the comparison to the threshold. A second data structure associated with the vehicle can be requested based on the search criteria. The second data structure can be provided to the vehicle.

In another aspect, an example system can comprise a first data structure comprising first locations and first data associated with the first locations. The example system can also comprise a computer processor configured to evaluate storage availability for the first data structure and categorize second locations from a second data structure based on travel information associated with a vehicle. The computer processor can be configured to generate search criteria configured to select, from the second data structure, third locations and second data associated with the third locations. The computer processor can be configured to generate the search criteria based on at least one of the storage availability and the categorization of the second locations. The computer processor can be further configured to update the first data structure based on the search criteria.

Additional advantages will be set forth in part in the description which follows or may be learned by practice.

The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a diagram illustrating an example data hierarchy for generating a data structure;

DETAILED DESCRIPTION

Figure 1:
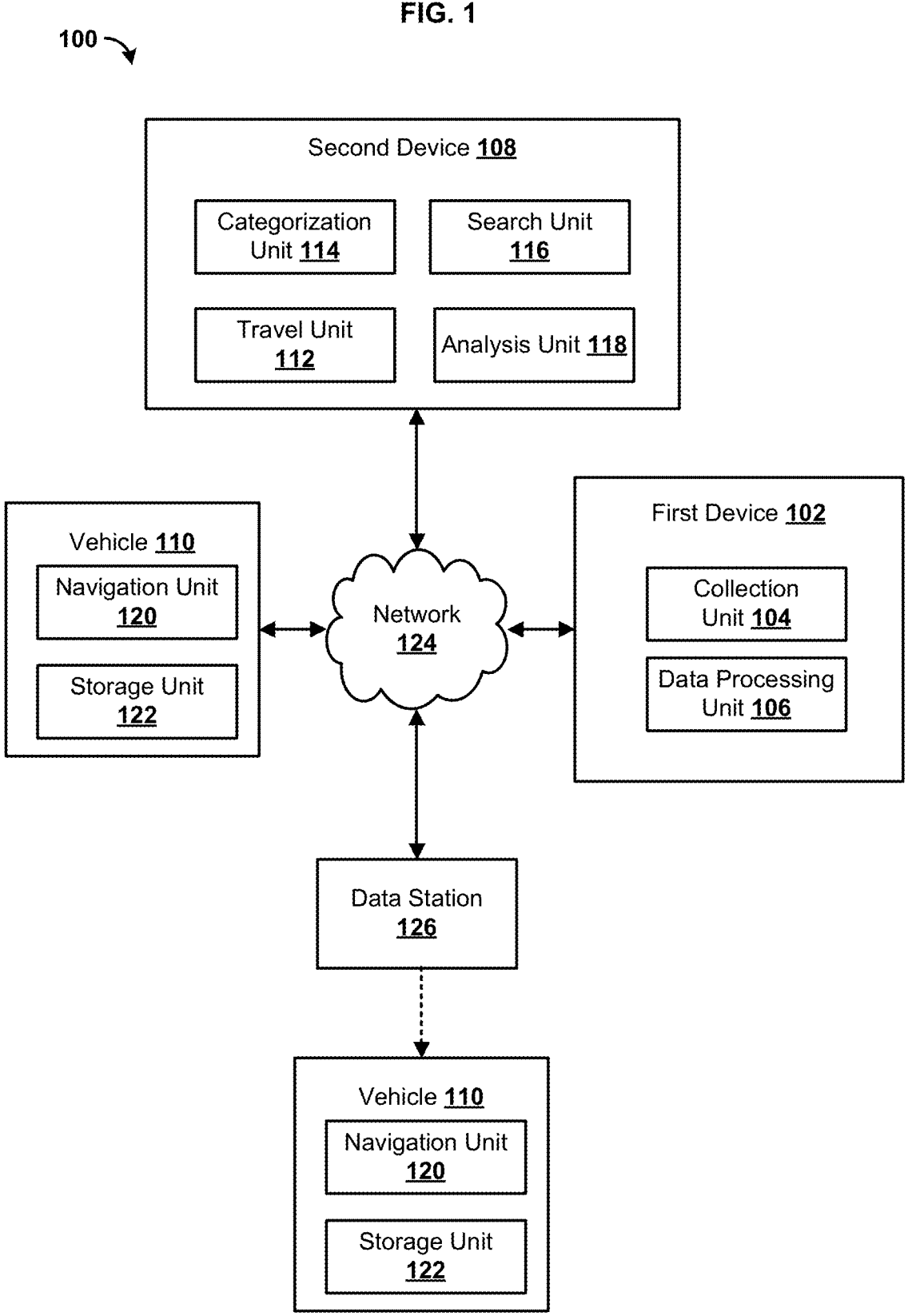
FIG. 1 is a block diagram illustrating various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for generating data structures. Specifically, the methods and systems relate to data structures for navigational systems of vehicles (e.g., aircraft, boats, cars). For example, data structures can comprise a plurality of locations and data associated with the locations. The locations can be associated with navigation procedures for operating the vehicle. For example, the data structure can provide information for a navigational system of aircraft. The present methods and systems can be used to refine data structures in order to limit the data structures. For example, the present methods and systems can generate and refine search criteria used to create a data structure. The search criteria can be specific to a particular vehicle. For example, the search criteria can be based on the categorization of locations associated with the vehicle. In one aspect, the present methods and systems can be configured to categorize the locations, for a specific vehicle, based on the travel information associated with the vehicle. After a data structure is generated, the storage size of the data structure can be compared to a threshold (e.g., a threshold specific to the vehicle or type of vehicle). If the storage size exceeds the threshold, then the search criteria can be refined and another data structure can be generated based on the refined search criteria. In one aspect, the process of generating data structures can be repeated on a regular cycle.

FIG. 1 is a block diagram illustrating various aspects of an exemplary system 100 in which the present methods and systems can operate. Those skilled in the art will appreciate that the present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more first device, second device, and/or vehicle. For example, the methods and systems disclosed can be located in the travel unit, categorization unit, search unit, and analysis unit of the second device.

Figure 12:
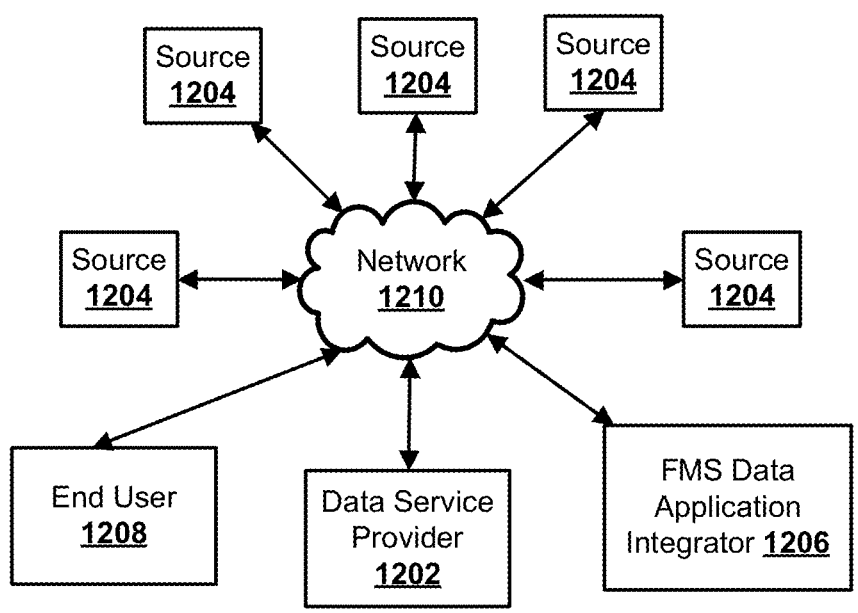
FIG. 12 shows a diagram of an example data flow.

In one aspect, the system 100 can comprise a first device 102 configured to collect data. For example, the first device 102 can comprise a collection unit 104 configured to collect and store data. In one aspect, the collection unit 104 can be configured to collect data related to a plurality of locations, such as geographic locations. Example locations can comprise ports (e.g., airports, harbors, stations), waypoints, refueling points, and the like. As an illustration, the collection unit 104 can receive data from one or more external data sources. For example, the data can be received from the nation state Aeronautical Information Services. In one aspect, the data can be received in electronic form or paper form. The data can be processed for storage in the collection unit 104. As an illustration, the data can be received as an Aeronautical Information Publication (AIP). In one aspect, the data can comprise airports, procedure, fixes, navigational aids, airways, and/or the like. As a further illustration FIG. 12 shows a diagram of an example data flow. For example, a data service provider 1202 can receive data from a variety of sources 1204, such as notices to airmen (NOTAM), AIPs, Aeronautical Information Service, and other state services. The data service provider 1202 can provide such data to a Flight Management System (FMS) data application integrator 1206 (e.g., first device 102). Then the FMS data application integrator 1206 can provide a data structure for an FMS of a vehicle to an end user 1208, such as a vehicle operator and owner (e.g., at the second device 108). In one aspect, the data can be transferred directly between the parties or through a network 1210.

In one aspect, the first device 102 can comprise a data processing unit 106 configured to generate data structures. For example, the first device 102 can receive requests for data based on search criteria. In response to a request, the first device 102 can generate a data structure, such as a database, comprising data from the collection unit 104. For example, the data processing unit 106 can be configured to select data stored by the collection unit 104 based on the search criteria provided by a requesting user and/or device. In one aspect, a request for data can comprise parameters indicative of a type of data structure and/or format. The data processing unit 106 can be configured to format the results of the search according to the parameters. For example, the parameters can be indicative of a type of data structure, such as a type of database. The parameters can be indicative of a device, such as a vehicle, on which the data structure is intended to be stored. In another aspect, the data processing unit 106 can convert ARINC 424 standard data file to a navigation database file of a flight management system of a vehicle. ARINC Specification 424-20 is herein incorporated by reference in its entirety. Additionally, all prior and subsequent versions to version 20 of ARINC 424 are herein incorporated by reference in their entirety.

In one aspect, the system 100 can comprise a second device 108 configured to manage data for one or more vehicles 110. The second device 108 can comprise a travel unit 112 configured to store and manage travel information. For example, the travel information can comprise travel history for one or more of the vehicles 110. The travel history can comprise a list of locations that the vehicle 110 has traveled to over a time period. As another example, the travel information can comprise travel plans for one or more vehicles 110. The travel plans can comprise a list of locations the vehicle 110 is scheduled to arrive at during a time period. In one aspect, the travel unit 112 can maintain a list of locations for one or more fleets of vehicles. For example, the travel unit 112 can maintain a list of all locations traveled to or scheduled to travel to by any of the vehicles of the fleet. The travel unit 112 can track which vehicles are associated with which locations. The travel unit 112 can also maintain a list of data associated with the locations.

In one aspect, the second device 108 can comprise a categorization unit 114 configured to categorize locations. In one aspect, the categorization unit 114 can receive and/or maintain a list of locations and data associated with the locations. For example, the list of locations and data associated with the locations can be based on travel information collected by the travel unit 112. The categorization unit 114 can be configured to categorize locations for specific vehicles 110. The categorization unit 114 can categorize locations according to categories, such as a first category, second category, third category, fourth category, and the like. The first category can indicate that the location is an intended and/or planned destination of a vehicle. The second category can indicate that a location is an alternate destination for the vehicle. The third category can indicate that a location is a second alternate destination for the vehicle. The fourth category can indicate that a location is an emergency destination for the vehicle.

Figure 2:
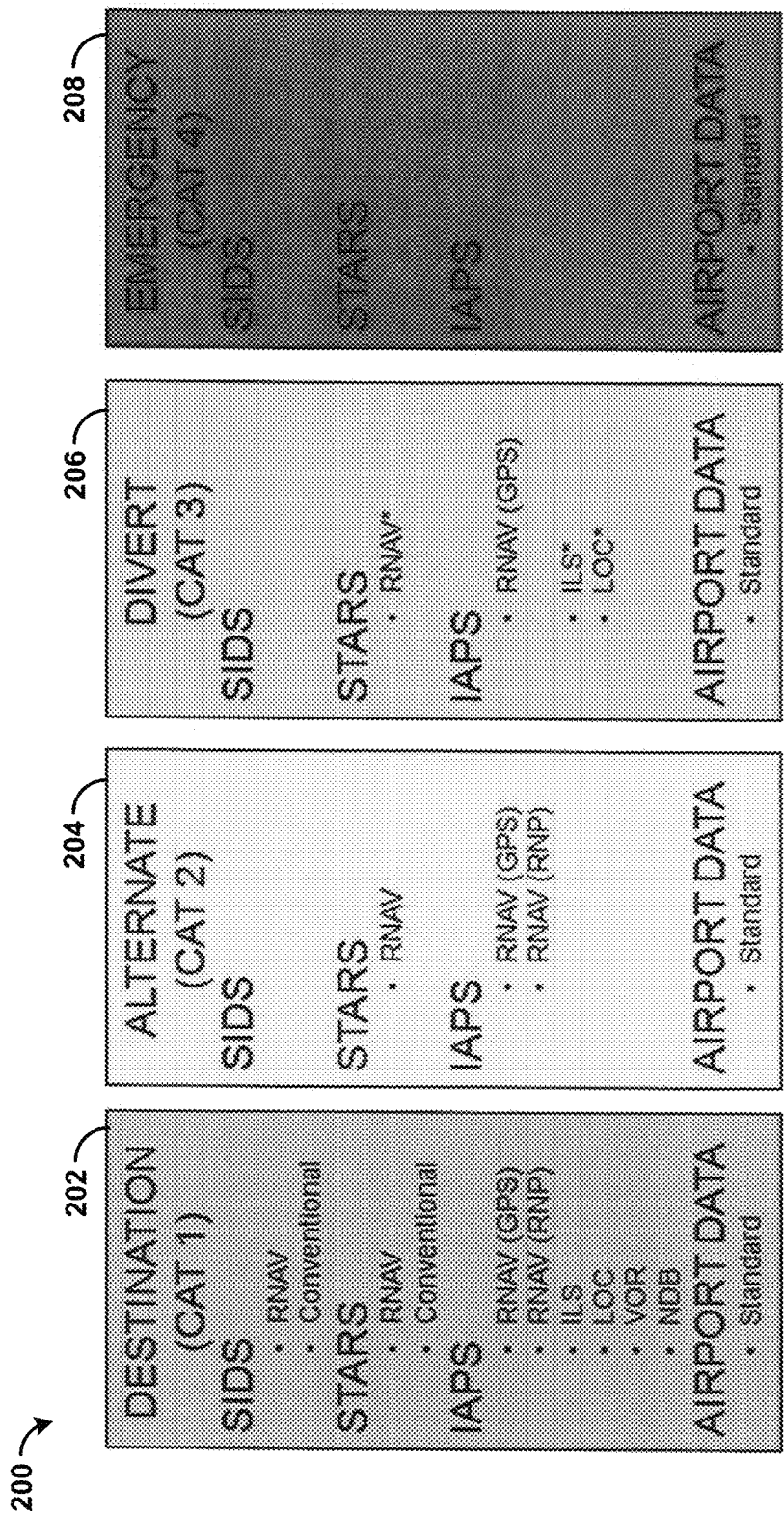
FIG. 2 is a diagram illustrating an example data hierarchy for an aircraft.

In one aspect, one or more categories can be associated with a data hierarchy configured to indicate amounts and/or types of data associated with different categories. For example, the first category can be associated with more data and/or more detailed data than the second category, third category, and fourth categories. The second category can be associated with more data and/or more detailed data than the third category and fourth category. The third category can be associated with more data and/or more detailed data than the fourth category. As described in more detail below, FIG. 2 is an example data hierarchy for an aircraft illustrating different categories and the data that can be retrieved for locations associated with each category.

In one aspect, the second device 108 can comprise a search unit 116 configured to request data (e.g., organized as a data structure) from the first device 102. The search unit 116 can be configured to generate search criteria for requesting data from the first device 102. In one aspect, the search criteria can be selected to retrieve data relevant to a specific vehicle. For example, the search criteria can be based on a categorization of locations associated with the vehicle by the categorization unit 114. The request can comprise additional search parameters, such a vehicle information (e.g., vehicle identifier, vehicle type) and data information (e.g., data structure type, data structure size).

In one aspect, the second device 108 can comprise an analysis unit 118 configured to receive and analyze data. For example, the analysis unit 118 can analyze data received from the first device 102 in response to a request from the search unit 116. The analysis unit 118 can be configured to determine the storage size of the data. The analysis unit 118 can be configured to determine a storage capacity of a vehicle associated with the data. The analysis unit 118 can be configured to compare the storage size of the data to the storage capacity of the vehicle. The analysis unit 118 can also compare the storage size to one or more thresholds. The one or more thresholds can be based can on the storage capacity of the vehicle. As an illustration, a first threshold can comprise 90 percent of storage capacity. A second threshold can comprise 95 percent of storage capacity. A third threshold can comprise 100 percent of storage capacity.

If the storage size of the data meets or exceeds one or more thresholds, the analysis unit 118 can be configured to further refine the data. For example, the analysis unit 118 can provide refinement criteria to the search unit 116, and the search unit 116 can request the data again based on the refinement criteria. As another example, the analysis unit 118 can be configured to remove and/or delete portions of the data. In one aspect, such portions of the data can be removed and/or deleted based on the refinement criteria. In another aspect, specific refinement criteria can be associated with one or more thresholds. For example, first refinement criteria can be associated with the first threshold. Second refinement criteria can be associated with the second threshold. Third refinement criteria can be associated with the third threshold. Example refinement criteria are described by FIG. 5 and its associated paragraphs as well as throughout the detailed description.

In one aspect, the analysis unit 118 can be configured to generate one or more reports based on changes in the data structures. For example, the report can be provided to an agent, such as an operator of the vehicle or a dispatcher associated with the vehicle. The report can be provided to an agent as a bulletin, desktop procedure guides, aircraft flight manual (AFM) supplements, and/or the like. As an illustration, the report can comprise operations constraints of an AFM text, a dispatch checklist (e.g., or Re-Route Checklist), an inflight reclassification change from "Q" to "/A" enroute to alternate location, post divert recovery filing outbound considerations (e.g., conventional SID or vector departure), crew procedures for Non-NavDB supported airports, and/or the like.

In one aspect, the system 100 can comprise one or more vehicles 110. A vehicle 110 can comprise a navigation unit 120 configured to assist in navigation of the vehicle 110. For example, the navigation unit 120 can be configured to provide information to an operator (e.g., pilot, captain, driver) of the vehicle. The information can be related to locations relevant to the vehicle. For example, the vehicle 110 can comprise a storage unit 122 configured to receive and store data from first device 102 and/or second device 108. In one aspect, the storage unit 122 can be configured to receive and store data requested by the search unit 116 of the second device 108. For example, the storage unit 122 can store a data structure, such as a database, comprising locations and data associated with locations.

In one aspect, the data structure can be packaged, compiled, or otherwise organized for compatibility with a specific vehicle 110. For example, one vehicle 110 can be associated with a first plurality of locations. Another vehicle 110 can be associated with a second plurality of locations. In some scenarios, some of the locations of the first plurality of locations can be included as locations in the second plurality of locations, and vice versa. In some scenarios, a location of first plurality of locations can be categorized differently than the same location in the second plurality of locations. For example, a location associated with the first category for one vehicle 110 can be associated with the second category, third category, or fourth category for another vehicle 110. For example, different vehicles 110 can be associated with different locations. As another example, one vehicle can be scheduled to visit one location and another vehicle can be scheduled to visit another location. Accordingly, locations can be categorized differently for different vehicles based on current, future, or past travel information. As another example, a data structure can be different for two different vehicles because a storage unit 122 of one vehicle can have different storage requirements (e.g., capacity, format) than a storage unit 122 of another vehicle 110.

In one aspect, the system 100 can comprise a network 124 configured to transfer data to and throughout the system 100. In one aspect, the network 124 can comprise a packet switched network (e.g., internet protocol based network), a non-packet switched network (e.g., quadrature amplitude modulation based network), and/or the like. The network 124 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 124 can be configured to provide communication from telephone, cellular, modem, and/or other electronic devices to and throughout the system 100.

As an illustration, the network 124 can transmit requests from the search unit 116 of the second device 108 to the first device 102. The network 124 can transmit the requested data from the first device 102 to the second device 108 and/or one or more vehicles 110. The network 124 can transmit data from the second device 108 to one or more vehicles 110. For example, the second device 108 can be configured to distribute data structures to vehicles 110. In another aspect, the system 100 can comprise one or more data stations 126 configured to receive data for one or more vehicles 110. For example, a data station 126 can be configured to prepare data for delivery to a vehicle 110 through a portable storage device, such as a CD-ROM, flash drive, solid state drive, magnetic disk, memory card, diskette, hard disk, or other storage medium. For example, the portable storage device can be periodically carried by a maintenance worker to the vehicle 110 and uploaded to the vehicle 110.

In one aspect, the present methods and systems can be implemented as part of the management of one or more aircrafts for a fleet of aircrafts. For example, each aircraft can comprise a Flight Management System (FMS) configured to operate with a data structure, such as a Navigational Database (NavDB) that is generated based on the Aeronautical Radio, Incorporated (ARINC) 28 day cycle. The data in the data structure can be used in the operation of the aircraft by providing flight navigation guidance through all phases of flight. This data that is typically stored in the NavDB has been growing in overall size at an annual rate of 8%. Unfortunately, FMS computer (FMC) in aircraft can have limited storage capacity. There has not been a recognized method of organizing NavDB content based on the storage constraints of the NavDB. In one aspect, an optimization process can be designed to first generate a baseline data structure to be included in each aircraft's database, standardize the content, and then remove selected portions of data (e.g., or generate a data structure without the portions of the data) to provide a data structure below the FMC storage capacity and accommodate expected future growth. Such process is illustrated in further detail by the following figures and description.

Figure 13:
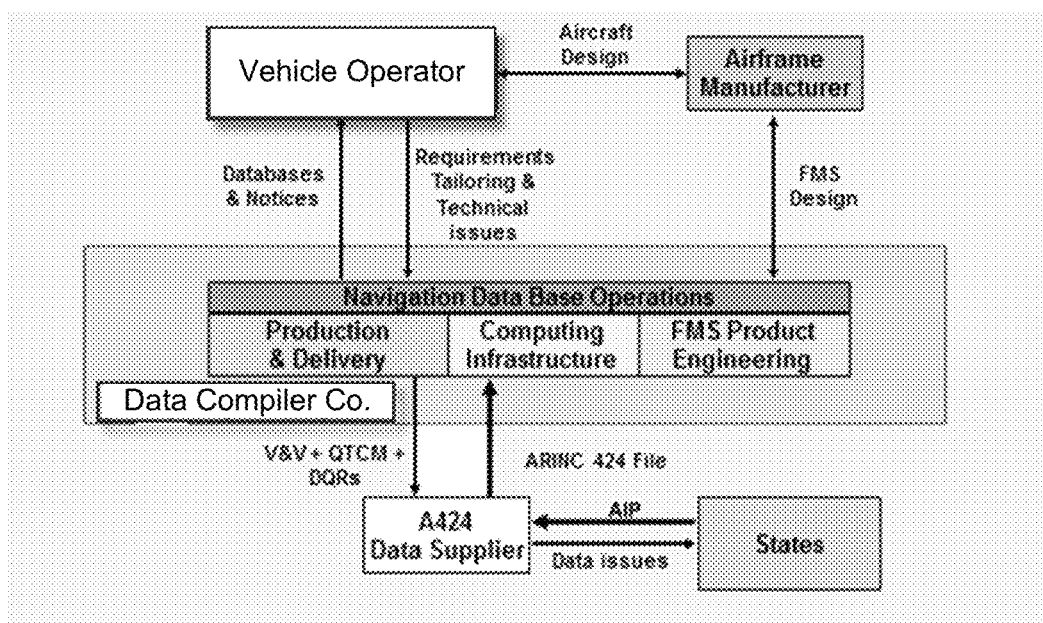
FIG. 13 shows data flow for an example vehicle operator.

FIG. 2 is a diagram illustrating an example data hierarchy 200 for an aircraft. In one aspect, the data hierarchy 200 can specify which data is to be retrieved for a location associated with a category. For example, the data hierarchy 200 can comprise a first category 202, second category 204, third category 206, and fourth category 208. In one aspect, the data hierarchy 200 can specify which data is to be received for a variety of data types. Example data types can comprise standard instrument departures (SIDS), standard terminal arrival routes (STARS), instrument approach procedures (TAPS), and airport data. As an example, data can comprise area navigation (RNAV) data, conventional data (e.g., non-RNAV data). Example approach procedures can comprise instrument landing system (ILS) data, localizer (LOC) data, VHF Omnidirectional Range beacon (VOR) data, non-directional beacon (NDB) data, and/or the like. Example airport data can comprise standard airport data, such as data, procedures, and the like derived from a Nation State Aeronautical Information Publication (AIP) without any modification or addition to the data. For example, the standard data can comprise data provided from an Aeronautical Information Publication (AIP). As an illustration, standard data can comprise AIP published data converted, without modification (e.g. other than format) or addition of data, into an ARINC 424 standard file by a Type 1 LOA holding Data Service Provider. Such Data Service Suppliers and avionics manufacturers can comply with FAA guidelines for the acceptance of data suppliers & avionics manufacturers as DO-200A compliant with respect to Navigation Databases. In contrast, data that is modified is no longer standard data but custom or tailored data. As a further illustration, FIG. 13 shows data flow for an example vehicle operator.

In one aspect, the first category 202 can be associated with locations that are destinations of a vehicle (e.g., aircraft). A destination can comprise a location that a particular vehicle goes for revenue freight service, a scheduled destination, and/or the like. In one aspect, the data hierarchy 200 can specify that all available procedures be made available for locations associated with the first category 202. For example, (RNAV SIDS, STARS and ALL APPROACHES). In one aspect, the first category 202 can have the highest level of services (e.g., approaches) available, and consequentially requires more storage space.

In one aspect, the second category 204 can be associated with locations that are alternate destinations of a vehicle (e.g., aircraft). For example, an alternate destination can comprise an airport that is, or may be used on a flight plan route (FPR) as an alternate (ALTN) for a given destination (DEST). This second category 204 can specify the same data as the first category, except without RNAV SIDS or CONVENTIONAL STARS. Eliminating this data saves considerable storage space. If a conventional STAR becomes assigned inbound to a specific airport, the crew can build the conventional STAR in the FMC from the Chart without filing code degradation or consequence. When traveling outbound, the aircraft can be filed on a conventional SID.

In one aspect, the third category 206 can be associated with locations that are diverted destinations of a vehicle (e.g., aircraft). A diverted destination can comprise a demoted alternate destination, or a promoted emergency destination. Locations associated with the third category 206 can be airports that have particularly challenging qualities (e.g. no conventional IAPS) that support inclusion of only RNAV Instrument Approaches and airport data. In one aspect, locations associated with the third category can with SIDs, STARS or CONVENTIONAL TAPs. In some scenarios, there can be advanced option technique to add ILS/LOC and RNAV STARS depending on memory utilization.

In one aspect, the fourth category 208 can be associated with locations that are emergency destinations of an aircraft. An emergency destination can comprise a good airfield but not a freight destination, or an alternate, that is still suitable or expected for city pairs and/or along route of flight. Locations associated with fourth category can only be provided with standard Airport Data. For example, such locations can be without SIDS, STARS or IAPs. For example, locations associated with the fourth category can have data for all runway (RWY) and airport definition data, and any associated Navaid frequencies associated with the location.

Figure 3:
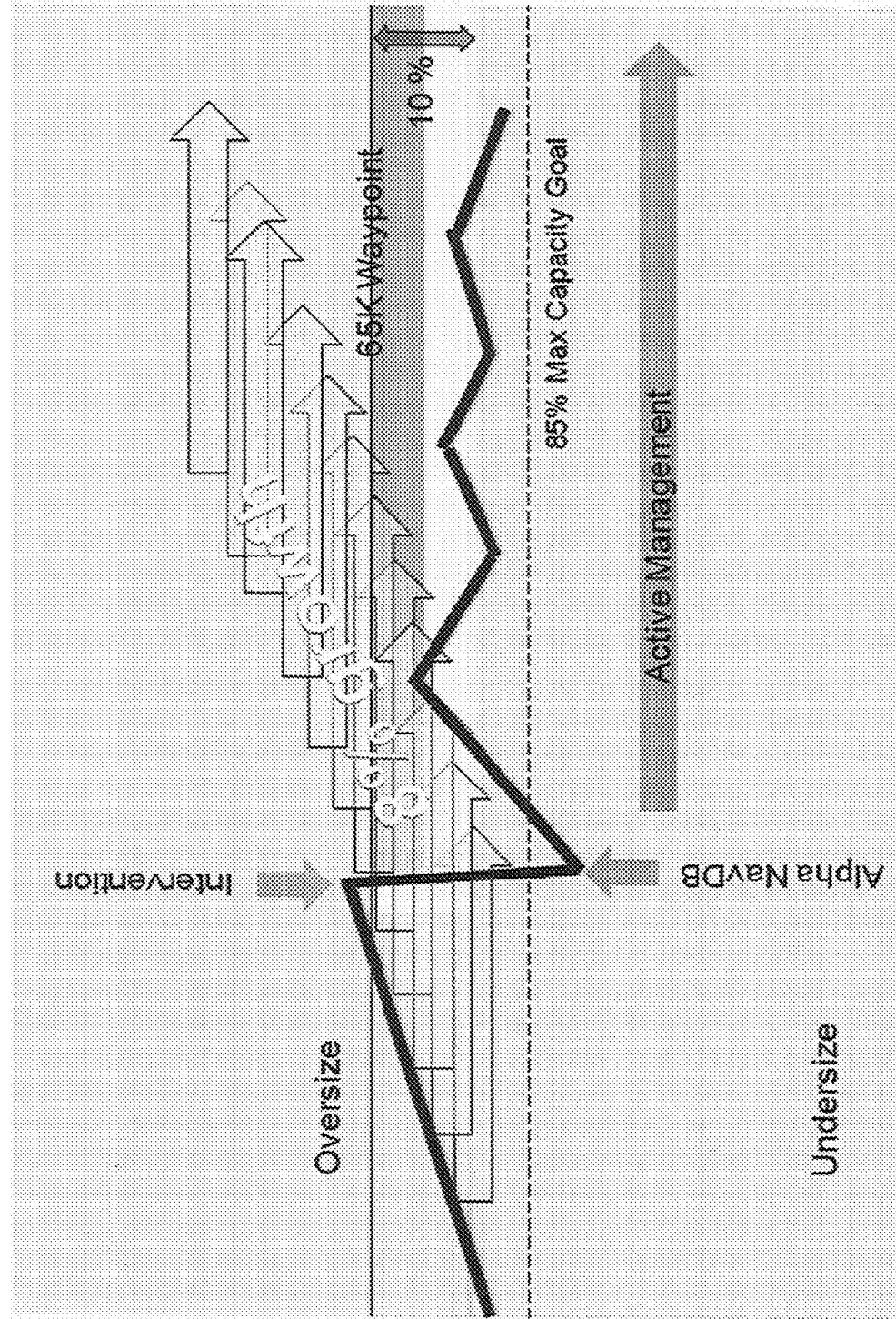
FIG. 3 is a diagram illustrating an example process for generating and refining data structures for a vehicle.

FIG. 3 is a diagram illustrating an example process 300 for generating and refining data structures for a vehicle. In one aspect, an oversized data structure can be generated. For example, the oversized data structure can exceed an oversize threshold. In response, the oversized data structure can be replaced with a new data structure (e.g., Alpha NavDB). The new data structure can be based on search criteria configured to limit the data structure below a threshold. The data structure can be regenerated immediately or after an extended period of time (e.g., in cycles of 28 days). It is contemplated that the overall data from which the data structure is generated can grow over time (e.g., as illustrated 8 percent growth). As the overall data grows, the same search criteria can result in subsequent data structures that are larger in size than previous data structures generated with the same search criteria. Thus, the search criteria can be further refined in response the subsequent data structures reaching size thresholds.

In one aspect, the process 300 can begin with a clean slate phase. In the clean slate phase, the process 300 can begin by erasing the existing data structure (e.g., NavDB) of a vehicle so that the data structure contains no specialized contents. In some implementations, the contents of the data structure can be saved in another location before erasing the data structure. The deleted contents of the data structure can then be reviewed and compared to a subsequent data structure that is generated. For example, the old data structure and the new data structure can be compared to see what data has been eliminated. As an example, airports, company routes, custom procedures, non-compulsory waypoints, National Reference Points, or guided VFR procedures can be removed from the data structure after the data structure is erased. Additionally, any other unnecessary and/or unauthorized Data (ARINC Field selectable) can be removed. As a result of erasing the data structure, the waypoint count in the data structure can be reduced to zero.

After the clean slate phase, the process 300 can proceed to a prospecting phase. During the prospecting phase, locations can be discovered and qualified. For example, a search can be performed to identify all known locations that a vehicle might visit, such as revenue destinations currently being planned and flown. The result of the search can be a list of airports that the vehicle flies to that is fleet specific. For example, the locations can be selected from a list of locations maintained by the travel unit 112 of FIG. 1. In one aspect, the list generated during the prospecting phase can be based on generic understanding of what a filed destination, filed alternate, or a convenient emergency aerodrome. In one aspect, the prospecting phase may require processing of data, such as operations Fly Out Scheduling products, Charter Operations, GOC city/alternate automation and past Flight Plan releases. In another aspect, the list generated in the prospecting phase can be based on third party information for locations associated with maintenance operations, depot operations, flight testing, futures planning, and/or painting. In one aspect, the prospecting phase can be completed without considering categorization of locations and can be accomplished without referencing or addressing a divert category.

FIG. 4 is a diagram illustrating an example data hierarchy for generating a data structure. In one aspect, the data structure can be referred to as an alpha data structure. The data structure can comprise a first compilation of data based on locations associated with the first category, second category and fourth category. In one aspect, search criteria can be generated based on these categories. The search criteria can be sent to a data provider for production of a fully operational data structure (e.g., NavDB). The data structure can be used operationally with one or more vehicles. In one aspect, the search criteria can be based on specific instruction sets exchanged with the data provider to manipulate the search criteria such that the search criteria obtains the data specified by the data hierarchy. For example, the search criteria can be based on ARINC discriminators that filter the available procedures included in the data structure. In one aspect, the search criteria can be selected such that a first threshold is met. For example, the first threshold can be set at 85 percent maximum capacity of a storage device. In one aspect, the search criteria can be based on a location limitation (e.g. waypoint FMC constraint limit). If a first attempt to generate the first data structure does not achieve between 85 to 90 percent max capacity, then a redaction technique(s) can be used.

In one aspect, the search criteria can be based on boolean criteria provided by the data provider. For example, in addition to search criteria related to the categorization of locations, the search criteria can be related and/or based on: area of operation (AOR) definition (e.g., theater of operations), region selection, default criteria (e.g., options), condition (e.g., less than 7000 foot runway, Victor Airways), filters, GEO areas, Multiple GEO areas, specialized data (e.g., HAR, Orphan T and Q Routes, Non-Compulsory, Enroute Holding).

As a further explanation, the search criteria can comprise rules provided to a FMS data integrator. In one aspect, the rules can comprise waypoint selection rules. The waypoint selection rules can be selected ON or OFF. When selected ON, waypoints can be filtered based on the category of the waypoint coded by ARINC 424 waypoint types. Example categories can comprise: waypoints referenced by STARS, Visual Reporting Points, Unnamed uncharted intersections, Special Use Airspace and Off-Route intersection points, waypoints referenced by SIDs, Instrument Approaches, Pitch and Catch points, grid waypoints, waypoints referenced by multiple, floaters, Latitude and Longitude with all zeroes in minutes and seconds, all waypoints not already included via other rules, and/or the like.

Figure 14A:
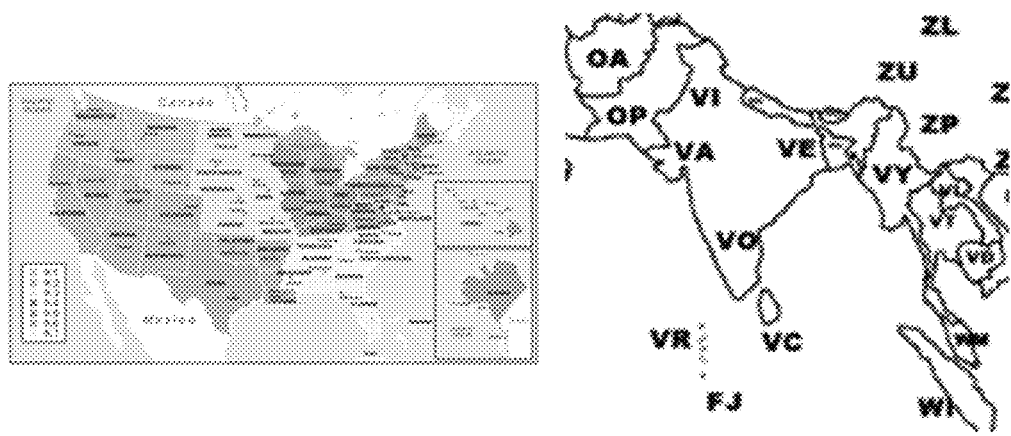
FIG. 14A is a diagram illustrating example ICAO codes.
Figure 14B:
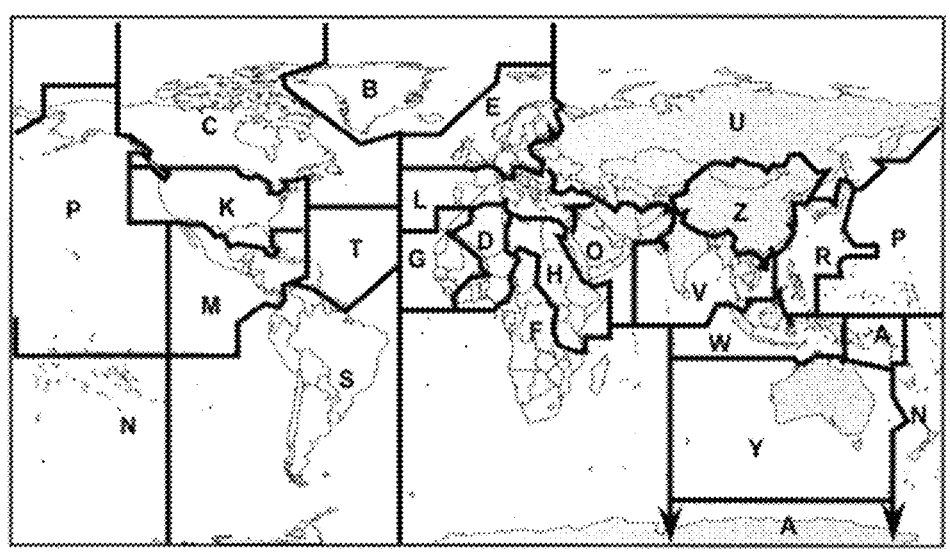
FIG. 14B is a diagram illustrating another example of ICAO codes.
Figure 14C:
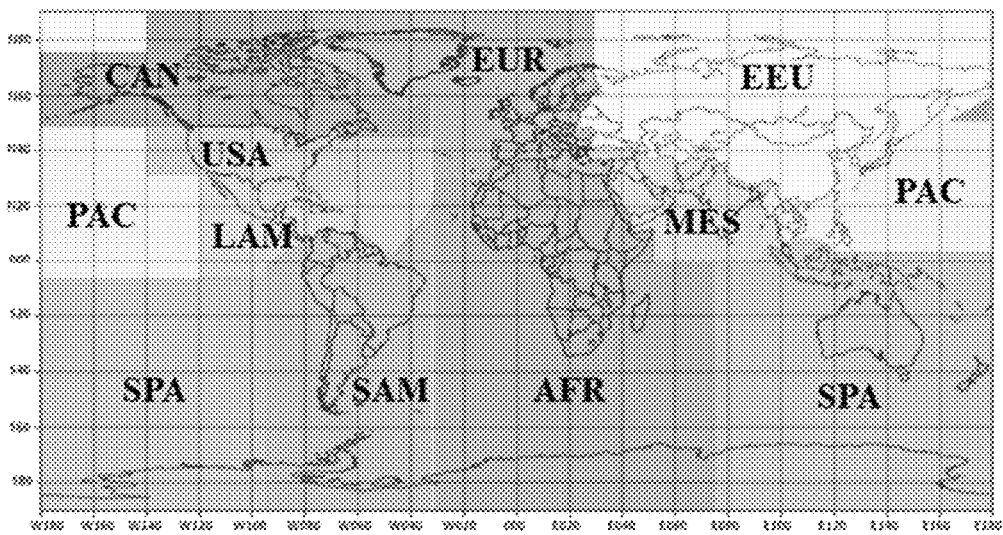
FIG. 14C is a diagram showing example region/areas that can be specified by the search criteria.

In one aspect, the search criteria can be based on a custom list of standard waypoints. For example, a group of points can be entirely excluded based on a search criterion or rule. If certain waypoints from this group of waypoints are identified as operationally important in day to day operations of a vehicle, then such waypoint can be specified on the custom list for inclusion in the data. In one aspect, the search criteria can be based on rules that limit the types of airways. For example, the search criteria can include or exclude Victor (e.g., low) Jet, Tacan, or GPS supported RNP types called T and Q routes. For example, a rule can define a distance from a location (e.g., airfield). A rule can specify certain types of airways based on whether the airway is within the defined distance. In one aspect, the search criteria can request locations with a runway that is less than or more than a specified runway length. In one aspect, the search criteria can specify (e.g., for inclusion or exclusion) data associated a set of countries by referring to region/Area or by Country Codes (e.g., ICAO codes). As a further example, FIG. 14A and FIG. 14B are diagrams illustrating example ICAO codes. FIG. 14C is a diagram showing example region/areas that can be specified by the search criteria.

In one aspect, the search criteria can specify any combination of Approaches, SIDS, STARs for specific locations (e.g., airports), as well as the ability to limit approach types at specific locations. In one aspect, the search criteria can comprise a rule to remove a particular type of instrument approach, such as all NDBs, or RNAV (RNP)'s, or both, or any other combination. The search criteria can also comprise rules to turn off duplicate types of instrument approaches to the same runway (RWY). For example, if there are four RNAV (GPS) approaches, the search criteria can specify inclusion of only the primary approach.

In one aspect, the search criteria can specify geometric areas (e.g., polygons on the earth surface), and rules and exceptions (e.g., as described herein) can be applied to such areas. The search criteria can define Theater or Area of Operation (AOR).

Figure 15A:
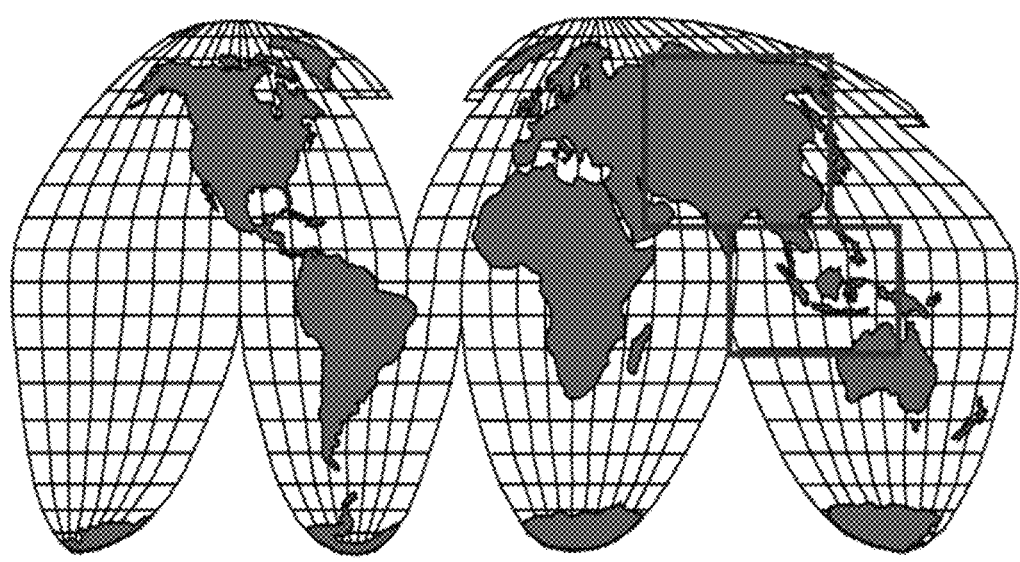
FIG. 15A is a diagram showing example geographic areas.
Figure 15B:
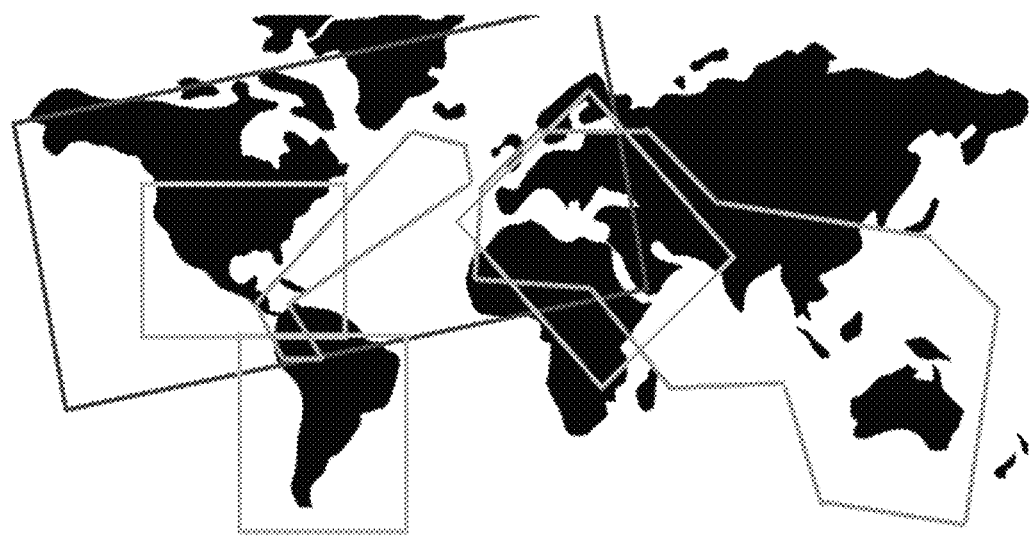
FIG. 15B is a diagram showing example geographic areas that overlap with other geographic areas.

In another aspect, search criteria can be further defined for each geometric area defined by a shape such as polygon. These search criteria can be applied, or nested to include or exclude as necessary to pair the data to a manageable size. For example, smaller geographic areas can be defined within larger geographic areas. As a further illustration, FIG. 15A is a diagram showing example geographic areas. FIG. 15B is a diagram showing example geographic areas that overlap with other geographic areas.

Figure 6:
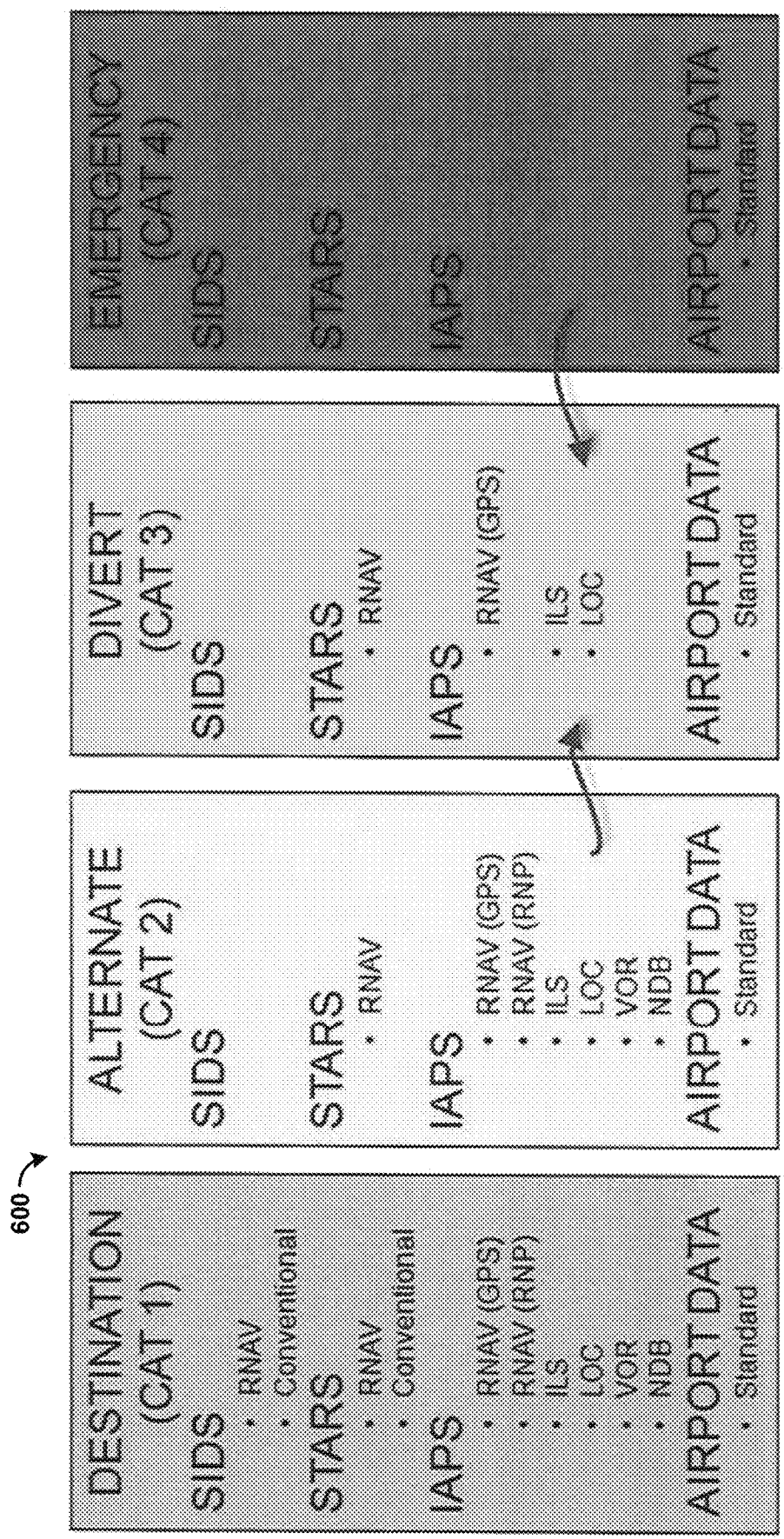
FIG. 6 is a diagram illustrating a data hierarchy for generating another data structure.

In one aspect, during the generation of the data structure search criteria related to the third category can be omitted. This option allows for the data structure to function as baseline for future generation of data structures. For example, as illustrated in FIG. 6, during a future generation of data structure, some locations can be modified such that they become associated with the third category. As an example, locations can be demoted from the second category and/or promoted from the fourth category to the third category.

In one aspect, the data structure can consist of relevant locations, such as airports, but further adjustment can be applied to the data structure and/or search criteria such that the data structure comprises only data necessary to operations as specified in the data hierarchy. For example, in order to prevent of data structures from being above storage limits, several thresholds can be used to evaluate the data structure. For example thresholds can be pre-defined at 90 percent and 95 percent of total storage capacity of a vehicle. In one aspect, one or more thresholds can have a prescribed set of structured actions to reduce the next cycle's contents to remain below the storage capacity.

In one aspect, a data structure can be oversized when the data structure exceeds the storage capacity of the vehicle for which the data structure is intended. Oversize conditions can be responded to with immediate, pre-planned and briefed steps with associated consequences. For example, if a data structure is oversized, it can be important to quickly respond to the data provider with refined search criteria in order to generate a smaller data structure. After the data structure is trimmed to an undersized quantity, the data structure can be produce and distributed. Additionally, management can be notified of the preplanned operational consequence. In one aspect, a variety of search criteria can be suggested in order reduce the size of the data structure. The search criteria can be based on the following policies. These suggested search criteria can be approved and provided to the data provider.

In one aspect, the search criteria can be refined to produce a smaller data structure as follows. The search criteria can specify that waypoints that are referenced (e.g., Referenced Only waypoint) can be selected for procedures and airways. Such criteria can remove all non-essential waypoints not included in a procedure. In one aspect, the search criteria can be refined incrementally over several build cycle of the data structure. For example, all non-reference waypoints can be included in the 75 NM circle around each location (e.g., airport), some locations or only the destination locations—or all at once. The search criteria can specify that only one JAP type per RWY end be included in the data structure. Such criteria can remove duplicate or multiple versions of IAP and all associated extra waypoints. The search criteria can specify that Victor Airways can be removed that are outside of 75 NM of the airport list. Such criteria allows for removal of commonly unnecessary points.

In one aspect, if the greater storage capacity is desired, an additional storage device can be activated, such as Gemini. Gemini can be a soft memory expansion that is not available on all aircraft and comes with monthly fee. Use of Gemini can comprise hiding data and procedures in Custom files that may warrant need for additional crew training. Because of this complication, use of Gemini should be the last resort.

In one aspect, when a data structure is greater than 95 percent of the storage capacity (e.g., but not oversized), the following policies can guide refinement: consider and/or redefine area or theater of operations (AOR) definition associated with a vehicle, verify that the locations continue to be categorized correctly and remove any unnecessary locations, adjust or make inclusive GEO Areas, remove required navigation performance authorization required procedures (RNP) (AR), restrict the second category locations to only RNAV (GPS) IAPs and RNAV STARS, and/or the like.

As a further explanation, when a data structure (e.g., NavDB) has exceeded 95% of a limiting resource capacity (e.g., Memory Space, Procedure Count, Airport Count, Waypoint Count) but still under 100% the data structure is still considered "undersize." The data structure is close to exceeding storage capacity (e.g., oversize in the near future, maybe next cycle). In some scenarios, the threshold value of 95% can be a good threshold at which to redefine the conditions and utility of the current contents and function of this data structure. Thus, validation and/or re-validation of the locations and associated categories (e.g., Destinations, Alternates and Emergency Airfields) can be performed. If the size of the data structure is not reduced enough by manipulation of the search criteria, then geometric areas (e.g., polygons on the earth surface) can be made with rules and exceptions applied within the areas. This action can define, at least in part, a finite Theater or Area of Operation (AOR). The area of operations can be associated with one or more vehicles. An AOR is generally less than the whole world and can provide geometric boundaries associated with activity (e.g., travel plan, travel history) of a vehicle.

In one aspect, when a data structure is greater than 90 percent of the storage capacity (e.g., but less than 95 percent), the following policies can guide refinement: remove High Altitude Reference Waypoints (e.g., suggest partial remove first criteria, such as all except East of KIND), remove ALL RVFPs (FMS VISUALs procedures), remove routes not referencing ground based navigational aids such as T and Q routes (e.g., suggest only a partial removal first), remove Country Codes/region selection (e.g., suggest removal of AFRICA), verify that the locations are categorized properly (e.g., destination, alternative, divert, emergency) and remove all unnecessary data, adjust or make inclusive geographic (GEO) Areas (e.g., country codes and ICAO codes), and/or the like. As previously explained, FIG. 14A-FIG. 14C and FIG. 15A-FIG. 15B are diagrams illustrating example geographic areas.

As a further explanation, when a data structure is greater than 90% storage capacity of a vehicle but still less than 95%, some mild modification to the data structure can be performed (e.g., by generating a new data structure or editing a data structure. As an example, High Altitude Reference Waypoints (HARS) are a set of waypoints, also called Navigational Reference System (NRS), that the FAA has created to create a grid across the country for high-altitude, RNAV-equipped aircraft. In one aspect, HARS/NRS waypoints that are never or rarely used (e.g., or used less than a threshold amount) can be removed from the data structure (e.g., by search criteria). For example, a location can be associated with HARS waypoints on both the west side and east side of the location. As a further example, HARS waypoints on the East side of the location can be removed from the data structure but HARS waypoints on the West of the location can remain in the data structure. As another example, any procedures that are restricted from actual Instrument Meteorological Conditions (IMC) can be removed. Such procedures can comprise RNAV VISUAL FLIGHT PROCEDURES (RVFPs) and FMS Visuals. Operationally, these procedures can be substituted by Radar Vectors to final or an actual IMC capable procedure in the FMS. As another example, T and Q routes can be removed. For example, T and Q routes are RNAV based routes across the country that do not reference any ground based Navaids. T and Q routes can be so numerous that they can be substituted with other options. For example, T and Q routes can be substituted for all Jet Routes and a small combination of HARS waypoints in an include list may suffice.

As a further illustration, example search criteria for an airplane can be as shown in Table 1, Table 2, and/or Table 3. For example, default search criteria can be defined as shown in Table 1. As another example, search criteria can be defined for a variety of groups, such as by geographic area, by area code, and/or the like as shown in Table 1. Search criteria can be defined by airport group as shown in Table 1 and Table 2. In one aspect, airport groups can be defined based on the category (e.g., destination, alternate, divert, emergency) associated with an airport as shown in Table 1 and Table 2. For example, search criteria can be organized by airport groups. As another example, selection criteria can comprise a list of waypoints, airways, and/or the like as shown in Table 3. For example, the criteria can specify specific information to include and/or exclude for certain criteria. For example, all procedures, no procedures, and/or the like for a given criteria can be specified. For specific categories (e.g., default, geographic area, airport group, ICAO code), rules can be selected for corresponding record types, such as AIRPORT, AIRPORT NDB, AIRPORT WAYPOINT, RUNWAY, ENROUTE NAVAID, LOCALIZER, ENROUTE NBD, ENROUTE WAYPOINT, ENROUTE AIRWAY, APPROACH, SIDS, STARS, and/or the like.

TABLE 1

| Selection Criteria for NAVDB: F77 | | |
| --- | --- | --- |
| General Criteria | None Selected | |
| Default Criteria | | |
| Record Type | Select | |
| AIRPORT | Referenced records only | |
| AIRPORT NDB | Referenced records only | |
| AIRPORT WAYPOINT | Referenced records only | |
| RUNWAY | Referenced records only | |
| ENROUTE NAVAID | Include All | |
| LOCALIZER | Referenced records only | |
| ENROUTE NBD | Include All | |
| ENROUTE WAYPOINT | By Rules (see below) | |
| Rules: | INCLUDE FLOATERS | Apply |
| | INCLUDE SUA AND OFFROUTE INTERSECTION POINTS | Apply |
| | INCLUDE PITCH AND CATCH POINTS | Apply |

TABLE 1-continued

Selection Criteria for NAVDB: F77

| | | |
|---|---|---|
| ENROUTE AIRWAY Rules: | By Rules (see below) EXCLUDE TACAN AIRWAYS | Apply |
| APPROACH | Referenced records only | |
| SIDS | Referenced records only | |
| STARS | Referenced records only | |
| AIF Runway Length Limit | None Selected | |
| RNP (nms) | None Selected | |

Selection By Geographic Area
Geographic Area Name: GE0_1

| Seq # | Latitude | Longitude |
|---|---|---|
| 10 | N90000000 | W180000000 |
| 20 | N90000000 | E180000000 |
| 30 | S90000000 | E180000000 |
| 40 | S90000000 | W180000000 |

| Record Type | Selection Rule |
|---|---|
| AIRPORT | Apply Default Criteria |
| AIRPORT NDB | Apply Default Criteria |
| AIRPORT WAYPOINT | Apply Default Criteria |
| RUNWAY | Apply Default Criteria |
| ENROUTE NAVAID | Apply Default Criteria |
| LOCALIZER | Apply Default Criteria |
| ENROUTE NBD | Apply Default Criteria |
| ENROUTE WAYPOINT | Apply Default Criteria |
| ENROUTE AIRWAY | Apply Default Criteria |
| APPROACH | Apply Default Criteria |
| SIDS | Apply Default Criteria |
| STARS | Apply Default Criteria |
| Selection By Area Code | None Selected |
| Selection By ICAO Code | None Selected |

Selection by Airport Group
Airport Group: ALTERNATES_RNAV_ I

| Record Type | Selection Rule | |
|---|---|---|
| AIRPORT | Include All | |
| AIRPORT NDB | Include All | |
| AIRPORT WAYPOINT | Reference Only | |
| RUNWAY | By Rules (see below) | |
| Rules: | INCLUDE LENGTH >= 6000 | Apply |
| LOCALIZER | Reference Only | |
| APPROACH | By Rules (See below) | |
| Rules: | INCLUDE MULTIPLE APPROACHES ALSO | Apply |
| | INCLUDE GPS_FMS_INDICATOR 0 | Apply |
| | INCLUDE GPS_FMS_INDICATOR 1 | |
| | INCLUDE GPS_FMS_INDICATOR 2 | |
| | INCLUDE GPS_FMS_INDICATOR 3 | |
| | INCLUDE GPS_FMS_INDICATOR 4 | |
| | INCLUDE GPS_FMS_INDICATOR 5 | |
| | INCLUDE GPS_FMS_INDICATOR A | |
| | INCLUDE GPS_FMS_INDICATOR B | |
| | INCLUDE GPS_FMS_INDICATOR C | |
| | INCLUDE GPS_FMS_INDICATOR G | |
| | INCLUDE GPS_FMS_INDICATOR L | |
| | INCLUDE GPS_FMS_INDICATOR P | |
| | INCLUDE GPS_FMS_INDICATOR U | |
| | INCLUDE ROUTE TYPES U | Apply |
| | INCLUDE ROUTE TYPES I | |
| | INCLUDE ROUTE TYPES J | |
| | INCLUDE ROUTE TYPES M | |
| | INCLUDE ROUTE TYPES B | |
| | INCLUDE ROUTE TYPES D | |
| | INCLUDE ROUTE TYPES L | |
| | INCLUDE ROUTE TYPES N | |
| | INCLUDE ROUTE TYPES P | |
| | INCLUDE ROUTE TYPES Q | |
| | INCLUDE ROUTE TYPES R | |
| | INCLUDE ROUTE TYPES S | |
| | INCLUDE ROUTE TYPES U | |
| | INCLUDE ROUTE TYPES V | |
| | INCLUDE ROUTE TYPES W | |
| | INCLUDE ROUTE TYPES X | |
| | EXCLUDE RNAV VISUALS | Appy |
| SIDS | Exclude All | |
| STARS | By Rules (see below) | |
| Rules: | INCLUDE ROUTE TYPES 4 | Apply |
| | INCLUDE ROUTE TYPES 5 | |
| | INCLUDE ROUTE TYPES 6 | |

AirportGroup: DESTINATIONS_ALLP I

| Record Type | Selection Rule | |
|---|---|---|
| AIRPORT | Include All | |
| AIRPORT NDB | Include All | |
| AIRPORT WAYPOINT | Reference Only | |
| RUNWAY | By Rules (see below) | |
| Rules: | INCLUDE LENGTH >= 6500 | Apply |
| LOCALIZER | Reference Only | |
| APPROACH | By Rules (see below) | |
| Rules: | INCLUDE ROUTE TYPES G | Apply |
| | INCLUDE ROUTE TYPES I | |
| | INCLUDE ROUTE TYPES J | |
| | INCLUDE ROUTE TYPES M | |
| | INCLUDE ROUTE TYPES B | |
| | INCLUDE ROUTE TYPES D | |
| | INCLUDE ROUTE TYPES L | |
| | INCLUDE ROUTE TYPES N | |
| | INCLUDE ROUTE TYPES P | |
| | INCLUDE ROUTE TYPES R | |
| | INCLUDE ROUTE TYPES S | |
| | INCLUDE ROUTE TYPES U | |
| | INCLUDE ROUTE TYPES V | |
| | INCLUDE ROUTE TYPES W | |
| | INCLUDE ROUTE TYPES X | |
| | EXCLUDE RNAV VISUALS | Apply |
| | INCLUDE MULTIPLE APPROACHES ALSO | Apply |
| | INCLUDE GPS_FMS_INDICATOR 0 | Apply |
| | INCLUDE GPS_FMS_INDICATOR 1 | |
| | INCLUDE GPS_FMS_INDICATOR 2 | |
| | INCLUDE GPS_FMS_INDICATOR 3 | |
| | INCLUDE GPS_FMS_INDICATOR 4 | |
| | INCLUDE GPS_FMS_INDICATOR 5 | |
| | INCLUDE GPS_FMS_INDICATOR A | |
| | INCLUDE GPS_FMS_INDICATOR B | |
| | INCLUDE GPS_FMS_INDICATOR C | |
| | INCLUDE GPS_FMS_INDICATOR P | |
| | INCLUDE GPS_FMS_INDICATOR U | |
| SIDS | Include All | |
| STARS | Include All | |

AirportGroup: EMERGENCY_NO_ I

| Record Type | Selection Rule | |
|---|---|---|
| AIRPORT | Include All | |
| AIRPORT NDB | Include All | |
| AIRPORT WAYPOINT | Reference Only | |
| RUNWAY | By Rules (see below) | |
| Rules: | INCLUDE LENGTH >= 6500 | Apply |
| LOCALIZER | Reference Only | |
| APPROACH | Reference Only | |
| SIDS | Reference Only | |
| STARS | Reference Only | |

TABLE 2

Selection Criteria for NAVDB: F77
Airport Group—Airport List
Airports:

| Ident | ICAO | ATA/IATA | Name | Std/Tld |
|---|---|---|---|---|
| Group Names: ALTERNATIVES_RNA_STAR | | | | |
| BIKF | BI | KEF | KEFLAVIK | Std |
| CYEG | CY | YEG | EDMONTON INTL | Std |
| CYFB | CY | YFB | IQALUIT | Std |
| CYHZ | CY | YHZ | STANFIELD INTL | Std |
| CYJT | CY | YJT | STEPHENVILLE | Std |
| CYMX | CY | YMX | MONTREAL INTL (MIRABEL) | Std |
| CYOW | CY | YOW | OTTAWA/MACDONALD-CARTIER INTL | Std |
| CYQB | CY | YQB | QUEBEC/LESAGE INTL | Std |
| CYQM | CY | YQM | GREATER MONCTON INTL | Std |
| CYQX | CY | YQX | GANDER INTL | Std |
| CYUL | CY | YUL | MONTREAL/PIERRE-ELLIOTT-TRUDEA | Std |
| CYVR | CY | YVR | VANCOUVER INTL | Std |
| CYWG | CY | YWG | RICHARDSON INTL | Std |
| CYXE | CY | YXE | SASKATOON/DIEFENBAKER INTL | Std |
| CYXY | CY | YXY | WHITEHORSE NIELSEN INTL | Std |
| CYYC | CY | YYC | CALGARY INTL | Std |
| CYYQ | CV | YYQ | CHURCHILL | Std |
| CYYR | CY | YYR | GOOSE BAY | Std |
| CYYT | CY | YYT | ST JOHN'S INTL | Std |
| CYZF | CY | YZF | YELLOWKNIFE | Std |
| EBBR | EB | BRU | BRUSSELS NATIONAL | Std |
| EDDL | ED | DUS | DUSSELDORF | Std |
| EGKK | EG | LGW | GATWICK | Std |
| EGLL | EG | LHR | HEATHROW | Std |
| EGPF | EG | GLA | GLASGOW | Std |
| EGPH | EG | EDI | EDINBURGH | Std |
| EGPK | EU | PIK | PRESTWICK | Std |
| EHAM | EH | AMS | SCHIPHOL | Std |
| EIDW | EI | DUB | DUBLIN INTL | Std |
| EINN | EI | SNN | SHANNON | Std |
| EKBI | EK | BLL | BILLUND | Std |
| ELLX | EL | LUX | LUXEMBOURG | Std |
| EPGD | EP | GDN | LECH WALESA | Std |
| EPWA | EP | WAW | CHOPIN | Std |
| KBFI | K1 | BFI | BOEING FIELD/KING CO INTL | Std |
| KGEG | K1 | GEG | SPOKANE INTL | Std |
| KPDX | K1 | PDX | PORTLAND INTL | Std |
| KCOS | K2 | COS | CITY OF COLORADO SPRINGS MUN | Std |
| KDEN | K2 | DEN | DENVER INTL | Std |
| KLAS | K2 | LAS | MC CARRAN INTL | Std |
| KSMF | K2 | SMF | SACRAMENTO INTL | Std |
| KDSM | K3 | DSM | DES MOINES INTL | Std |
| KFAR | K3 | FAR | HECTOR INTL | Std |
| KICT | K3 | ICT | WICHITA MID-CONTINENT | Std |
| KMCI | K3 | MCI | KANSAS CITY INTL | Std |
| KMSP | K3 | MSP | MINNEAPOLIS-ST PAUL INTL/WOLD- | Std |
| KSGF | K3 | SGF | SPRINGFIELD-BRANSON NATL | Std |
| KSTL | K3 | STL | LAMBERT-ST LOUIS INTL | Std |
| KLIT | K4 | LIT | BILL & HILLARY CLINTON NATL/AD | Std |
| KSHV | K4 | SHV | SHREVEPORT REGL | Std |
| KTUL | K4 | TUL | TULSA INTL | Std |
| KCLE | K5 | CLE | CLEVELAND-HOPKINS INTL | Std |
| KLCK | K5 | LCK | RICKENBACKER INTL | Std |
| KMKE | K5 | MKE | GEN MITCHELL INTL | Std |
| KSDF | K5 | SDF | LOUISVILLE INTL-STANDIFORD | Std |
| KBDL | K6 | BDL | BRADLEY INTL | Std |
| KBGR | K6 | BGR | BANGOR INTL | Std |
| KBWI | K6 | BWI | BALTIMORE/WASHINGTON INTL THUR | Std |
| KMHT | K6 | MHT | MANCHESTER | Std |
| KPHL | K6 | PHL | PHILADELPHIA INTL | Std |
| KBHM | K7 | BHM | BIRMINGHAM-SHUTTLESWORTH INTL | Std |
| KBNA | K7 | BNA | NASHVILLE INTL | Std |
| KCLT | K7 | CLT | CHARLOTTE/DOUGLAS INTL | Std |
| KNQA | K7 | NQA | MILLINGTON REGL JETPORT | Std |
| KTYS | K7 | TYS | MC GHEE TYSON | Std |
| LEMD | LE | MAD | BARAJAS | Std |
| LEST | LE | SCQ | SANTIAGO | Std |
| LFPO | LF | ORY | ORLY | Std |
| LPAZ | LP | SMA | SANTA MARIA | Std |
| LPLA | LP | TER | LAJES AB | Std |
| LPPR | LP | OPO | FRANCISCO SA CARNEIRO | Std |
| LPPT | LP | LIS | LISBON | Std |
| LSZH | LS | ZRH | ZURICH | Std |
| OAIX | OA | OAI | BAGRAM | Std |
| OBBI | OB | BAH | BAHRAIN INTL | Std |
| OERY | OE | | RIYADH AB | Std |
| OMAA | OM | AUH | ABU DHABI INTL | Std |
| OMRK | OM | RKT | RAS AL KHAIMAH INTL | Std |
| OMSJ | OM | SKI | SHARJAH INTL | Std |
| ODMS | OO | MCT | MUSCAT INTL | Std |
| ORBI | OR | BGW | BAGHDAD INTL | Std |
| OTBD | OT | DOH | DOHA INTL | Std |
| PABR | PA | BRW | WILEY POST-WILL ROGERS MEML | Std |
| PACD | PA | CDB | COLD BAY | Std |
| PAED | PA | EDF | ELMENDORF AFB | Std |
| PAEI | PA | EIL | EIELSON AFB | Std |
| PAKN | PA | AKN | KING SALMON | Std |
| PASY | PA | SYA | EARECKSON AS | Std |
| PGSN | PG | SPN | FRANCISCO C. ADA/SAIPAN INTL | Std |
| PGUA | PG | UAM | ANDERSEN AFB | Std |
| PGUM | PG | GUM | INTL HICKAM | Std |
| PHIK | PH | HIK | AFB HILO | Std |
| | PH | ITO | INTL | Std |
| PMDY | PM | MDY | HENDERSON FIELD | Std |
| PWAK | PW | AWK | WAKE I | Std |
| RCKH | RC | KHH | KAOHSIUNG INTL | Std |
| RJCC | RJ | CTS | NEW CHITOSE | Std |
| RJCH | RJ | HKD | HAKODATE | Std |
| RJFF | RI | FUK | FUKUOKA | Std |
| RJFK | RJ | KOJ | KAGOSHIMA | Std |
| RJGG | RJ | NGO | CHUBU CENTRAIR INTERNATIONAL | Std |
| RJOO | RJ | ITM | OSAKA INTL | Std |
| RJTT | RJ | HND | TOKYO (HANEDA) INTL | Std |
| RJTY | RJ | OKO | YOKOTA AB | Std |
| RKPC | RK | CJU | JEJU INTL | Std |
| RKPK | RK | PUS | GIMHAE INTL | Std |
| RKSO | RK | OSN | OSAN AB | Std |
| RKSS | RK | GMP | GIMPO INTL | Std |
| ROAH | RO | OKA | NAHA | Std |
| RODN | RO | DNA | KADENA AB | Std |
| RPLC | RP | CRK | DIOSDADO MACAPAGAL INTL | Std |
| TXKF | TX | BDA | L F WADE INTL | Std |
| UAAA | UA | ALA | ALMATY | Std |
| UACC | UA | TSE | ASTANA | Std |
| UAII | UA | CIT | SHYMKENT | Std |
| UAKK | UA | KGF | KARAGANDA | Std |
| UATT | UA | AKX | AKTOBE | Std |
| UBBB | UB | GYD | HEYDAR ALIYEV INTL | Std |
| UCFM | UC | FRU | MANAS | Std |
| UDYZ | UD | EVN | ZVARTNOTS | Std |
| UHHH | UH | KHV | NOVY | Std |
| UHMA | UH | DYR | UGOLNY | Std |
| UHMM | UH | GDX | SOKOL | Std |
| UHPP | UH | PKC | YELIZOVO | Std |
| UHSS | UH | UUS | KHOMUTOVO | Std |

TABLE 2-continued

Selection Criteria for NAVDB: F77
Airport Group—Airport List
Airports:

| Ident | ICAO | ATA/IATA | Name | Std/Tld |
|---|---|---|---|---|
| UHWW | UH | VVO | KNEVICHI | Std |
| UTDD | UT | DYU | DUSHANBE | Std |
| UTSS | UT | SKD | SAMARKAND | Std |
| UTTT | UT | TAS | YUZHNY | Std |
| VMMC | VM | MFM | MACAO INTL | Std |
| VOHS | VO | HYD | RAJIV GANDHI INTL | Std |
| VOMM | VO | MAA | CHENNAI INTL | Std |
| VYYY | VY | RGN | YANGON INTL | Std |
| WMKK | WM | KUL | KUALA LUMPUR INTL-SEPANG | Std |
| WMKP | WM | PEN | PENANG INTL | Std |
| ZBSJ | ZB | SJW | ZHENGDING | Std |
| ZBTJ | ZB | TSN | BINHAI | Std |
| ZBYN | ZB | TYN | WUSU | Std |
| ZGHA | ZG | CSX | HUANGHUA | Std |
| ZHHH | ZH | WUH | TIANHE | Std |
| ZSHC | ZS | HGH | XIAOSHAN | Std |
| ZSJN | ZS | TNA | YAOQIANG | Std |
| ZSQD | ZS | TAO | LIUTING | Std |
| ZSSS | ZS | SHA | HONGQIAO | Std |
| ZUUU | ZU | CTU | SHUANGLIU | Std |
| ZUXC | ZU | XIC | QINGSHAN | Std |
| ZYHB | ZY | HRB | TAIPING | Std |
| ZYTX | ZY | SHE | TAOXIAN | Std |
| | | | Group Name: DESTINATIONS_ALLPRC | |
| CYYZ | CY | YYZ | TORONTO/PEA.RSON INTL | Std |
| EDDF | ED | FRA | FRANKFURT/MAIN | Std |
| EDDK | ED | CON | COLOGNE-BONN | Std |
| EDDM | ED | MUC | MUNICH | Std |
| EGCC | EG | MAN | MANCHESTER | Std |
| EGSS | EG | STN | STANSTED | Std |
| KPAE | K1 | PAE | SNOHOMISH CO | Std |
| KSEA | K1 | SEA | SEATTLE-TACOMA INTL | Std |
| KLAX | K2 | LAX | LOS ANGELES INTL | Std |
| KOAK | K2 | OAK | METRO OAKLAND INTL | Std |
| KONT | K2 | ONT | ONTARIO INTL | Std |
| KSAN | K2 | SAN | SAN DIEGO INTL | Std |
| KSFO | K2 | SFO | SAN FRANCISCO INTL | Std |
| KSLC | K2 | SLC | SALT LAKE CITY INTL | Std |
| KARA | K4 | ARA | ACADIANA REGL | Std |
| KDFW | K4 | DFW | DALLAS-FT WORTH INTL | Std |
| KDTW | K5 | DTW | DETROIT METRO WAYNE CO | Std |
| KIND | K5 | IND | INDIANAPOLIS INTL | Std |
| KORD | K5 | ORD | CHICAGO-O'HARE INTL | Std |
| KBOS | K6 | BOS | LOGAN INTL | Std |
| KEWR | K6 | EWR | NEWARK LIBERTY INTL | Std |
| KIAD | K6 | IAD | WASHINGTON DULLES INTL | Std |
| KJFK | K6 | JFK | KENNEDY INTL | Std |
| KATL | K7 | ATL | HARTSFTELD-JACKSON ATLANTA I | Std |
| KCHS | K7 | CHS | CHARLESTON AFB/INTL | Std |
| KHSV | K7 | HSV | HUNTSVILLE INTL-JONES | Std |
| KMEM | K7 | MEM | MEMPHIS INTL | Std |
| LFPG | LF | CDG | CHARLES-DE-GAULLE | Std |
| LIMC | LI | MXP | MALPENSA | Std |
| OMDB | OM | DXB | DUBAI INTL | Std |
| PAFA | PA | FAI | FAIRBANKS INTL | Std |
| PANC | PA | ANC | STEVENS ANCHORAGE INTL | Std |
| PHNL | PH | HNL | HONOLULU INTL | Std |
| RCTP | RC | TPE | TAIWAN TAOYUAN INTL | Std |
| RJAA | RJ | NRT | NARITA INTL | Std |
| RJBB | RJ | KIX | KANSAI INTL | Std |
| RKSI | RK | ICN | INCHEON INTL | Std |
| RPLL | RP | MNL | NINOY AQUINO INTL | Std |
| VABB | VA | BOM | CHHATRAPATI SHIVAJI INTL | Std |
| VHHH | VH | HKG | HONG KONG INTL | Std |
| VIDP | VI | DEL | INDIRA GANDHI INTL | Std |
| VOBL | VO | BLR | BANGALORE INTL | Std |
| WSSS | WS | SIN | CHANGI | Std |
| ZBAA | ZB | PEK | BEIJING CAPITAL | Std |
| ZGGG | ZG | CAN | BAIYUN | Std |
| ZGSZ | ZG | SZX | BAOAN | Std |
| ZSPD | ZS | PVG | PUDONG | Std |
| ZWWW | ZW | URC | DIWOPU | Std |
| | | | Group Name: EMERGENCY_NO_PRCDS | |
| BGSF | BG | SFJ | KANGERLUSSUAQ | Std |
| CYGL | CY | YGL | LA GRANDE RIVIERE | Std |
| CYQR | CY | YQR | REGINA INTL | Std |
| CYVO | CY | YVO | VAL-D'OR | Std |
| CYYB | CY | YVB | NORTH BAY | Std |
| DAAG | DA | ALG | HOUARI BOUMEDIENE | Std |
| DNAA | DN | ABV | NNAMDI AZIKIWE INTL | Std |
| DTTA | DT | TUN | CARTHAGE | Std |
| EDDP | ED | LEJ | LEIPZIG-HALLE | Std |
| EFHK | EF | HEL | VANTAA | Std |
| EGAA | EG | BFS | ALDERGROVE | Std |
| EGBB | EG | BHX | BIRMINGHAM | Std |
| ENBO | EN | BOO | BODO | Std |
| ENBR | EN | BGO | FLESLAND | Std |
| ENZV | EN | SVG | SOLA | Std |
| EYVI | EY | VNO | VILNIUS INTL | Std |
| KPHX | K2 | PHX | PHOENIX SKY HARBOR INTL | Std |
| KIAH | K4 | IAH | GEORGE BUSH INTERCO NTINENTAL/H | Std |
| KOKC | K4 | OKC | WILL ROGERS WORLD | Std |
| KPSM | K6 | PSM | PORTSMOUTH INTL AT PEASE | Std |
| KMIA | K7 | MIA | MIAMI INTL | Std |
| LEAL | LE | ALC | ALICANTE | Std |
| LGAV | LG | ATH | ELEFTHERIOS VENIZELOS INTL | Std |
| LIRF | LI | FCO | FIUMICINO | Std |
| LLBG | LL | TLV | BEN GURION | Std |
| LTBA | LT | IST | ATATURK | Std |
| LTCC | LT | DIY | DIYARBAKIR | Std |
| OIII | OI | THR | MEHRABAD INTL | Std |
| OJAI | OJ | AMM | QUEEN ALIA INTL | Std |
| OKBK | OI | KWI | KUWAIT INTL | Std |
| OPKC | OP | KHI | JINNAH INTL | Std |
| PADK | PA | ADK | ADAK | Std |
| PAJN | PA | JNU | JUNEAU INTL | Std |
| PAYA | PA | YAK | YAKUTAT | Std |
| RJCM | RJ | MMB | MEMANBETSU | Std |
| UASK | UA | UKK | UST-KAMENOGORSK | Std |
| UATG | UA | GUW | ATYRAU | Std |
| UEEE | UE | YKS | YAKUTSK | Std |
| UERR | UE | MJZ | MIRNY | Std |
| UGTB | UG | TBS | TBILISI | Std |
| UIII | UI | IKT | IRKUTSK | Std |
| UKBB | UK | KBP | BORYSPIL' | Std |
| ULAA | UL | ARH | TALAGI | Std |
| ULLI | UL | LED | PULKOVO | Std |
| UMMS | UM | MSQ | MINSK-2 | Std |
| UNKL | UN | KJA | YEMELYANOVO | Std |
| UNNT | UN | OVB | TOLMACHEVO | Std |
| URWW | UR | VOG | GUMRAK | Std |
| USCC | US | CEK | BALANDINO | Std |
| USSS | US | SVX | KOLTSOVO | Std |
| UUDD | UU | DME | DOMODEDOVO | Std |
| UUEE | UU | SVO | SHEREMETYEVO | Std |
| UWOR | UW | OSW | ORSK | Std |
| UWUU | UW | UFA | UFA | Std |
| UWWW | UW | KUF | KUMRUMOCH | Std |
| VANP | VA | NAG | DR. AMBEDKAR INTL | Std |
| VECC | VE | CCU | NETAJI SUBHASH CHANDRA BOSE IN | Std |
| VGHS | VG | DAC | HAZRAT SHAHJALAL INTL | Std |
| VVNB | VV | HAN | NOI BAI INTL | Std |
| VYMD | VY | MDL | MANDALAY INTL | Std |
| ZBMZ | ZB | NZH | XIJIAO | Std |
| ZGKL | ZG | KWL | LIANGJIANG | Std |
| ZLLL | ZL | ZGC | ZHONGCHUAN | Std |
| ZLXY | ZL | XIY | XIANYANG | Std |

TABLE 2-continued

Selection Criteria for NAVDB: F77
Airport Group—Airport List
Airports:

| Ident | ICAO | ATA/IATA | Name | Std/Tld |
|---|---|---|---|---|
| ZPPP | ZP | KMG | CHANGSHUI | Std |
| ZUCK | ZU | CKG | JIANGBEI | Std |
| ZUGY | ZU | KWE | LONGDONGBAO | Std |
| ZWSH | ZW | KHG | KASHI | Std |

TABLE 3

Selection Criteria for NAVDB: F77
Select Records by List

ENROUTE AIRWAY to be INCLUDED

| | Area Code | Route Ident |
|---|---|---|
| 1 | % | P184 |

ENROUTE WAYPOINT to be INCLUDED

| | Waypoint Icao | Waypoint Ident |
|---|---|---|
| 1 | MM | |
| 2 | RJ | |
| 3 | VH | |
| 4 | VH | |
| 5 | VH | |
| 6 | VH | |
| 7 | VH | |
| 8 | MY | |
| 9 | K5 | |
| 10 | K7 | |
| 11 | K7 | |
| 12 | K2 | |
| 13 | K5 | |
| 14 | CY | |
| 15 | CY | |
| 16 | K6 | |
| 17 | K7 | |
| 18 | K5 | |
| 19 | K5 | |
| 20 | K5 | |
| 21 | K3 | |
| 22 | CY | |
| 23 | K5 | |
| 24 | K5 | |
| 25 | K5 | |
| 26 | K6 | |
| 27 | K5 | |
| 28 | K5 | |
| 29 | K3 | |
| 30 | K6 | |
| 31 | K6 | |
| 32 | K6 | |
| 33 | K2 | |
| 34 | K5 | |
| 35 | K5 | |
| 36 | K5 | |
| 37 | K5 | |
| 38 | K5 | |
| 39 | K5 | |
| 40 | K6 | MEZCA |
| 41 | K6 | KIJYY |
| 42 | K6 | MONTA |
| 43 | K4 | GOBBI |
| 44 | K5 | ROCKY |
| 45 | K5 | TOFEE |
| 46 | K5 | MULET |
| 47 | K5 | ACMEE |
| 48 | K5 | K148Q |
| 49 | K5 | ILIDO |
| 50 | K5 | IBUFY |
| 51 | K5 | GARNE |
| 52 | K5 | WORDY |
| 53 | K5 | BACHO |
| 54 | K2 | LORNA |
| 55 | K6 | KAYNE |
| 56 | K2 | ALUTE |
| 57 | K4 | PROTN |
| 58 | K2 | EMEGE |
| 59 | K2 | DUTSH |
| 60 | K2 | MAHER |
| 61 | K5 | SAVEX |
| 62 | K5 | ARLYN |
| 63 | K6 | ADELL |
| 64 | BG | HERAK |
| 65 | CY | KELLE |
| 66 | CY | DELHI |
| 67 | CY | ACCRA |
| 68 | CY | HILTY |
| 69 | CY | CLOWW |
| 70 | CY | ONEPS |
| 71 | CY | KEMPR |
| 72 | K6 | KICHI |
| | | KC72Q |
| | | BEKKI |
| | | BLOKR |
| | | BACEN |
| | | MAYJI |
| | | DUFEE |
| | | WORRN |
| | | LYNTT |
| | | MYNOT |
| | | MAYJI |
| | | EMMLY |
| | | ELNAR |
| | | EARND |
| | | CYBIL |
| | | CARYN |
| | | CMSKY |
| | | BIZAR |
| | | ACITO |
| | | KC75Q |
| | | DILNE |
| | | PEONS |
| | | BRNAN |
| | | NWLYN |
| | | JUNER |
| | | TATOO |
| | | INSLO |
| | | JSICA |
| | | HIDON |
| | | BUBBA |
| | | PSYKO |
| | | 5950N |
| | | 5850N |
| | | 5350N |
| | | 5250N |
| | | 5150N |
| | | 5050N |
| | | 4950N |
| | | 4850N |
| | | 4350N |

Figure 5:
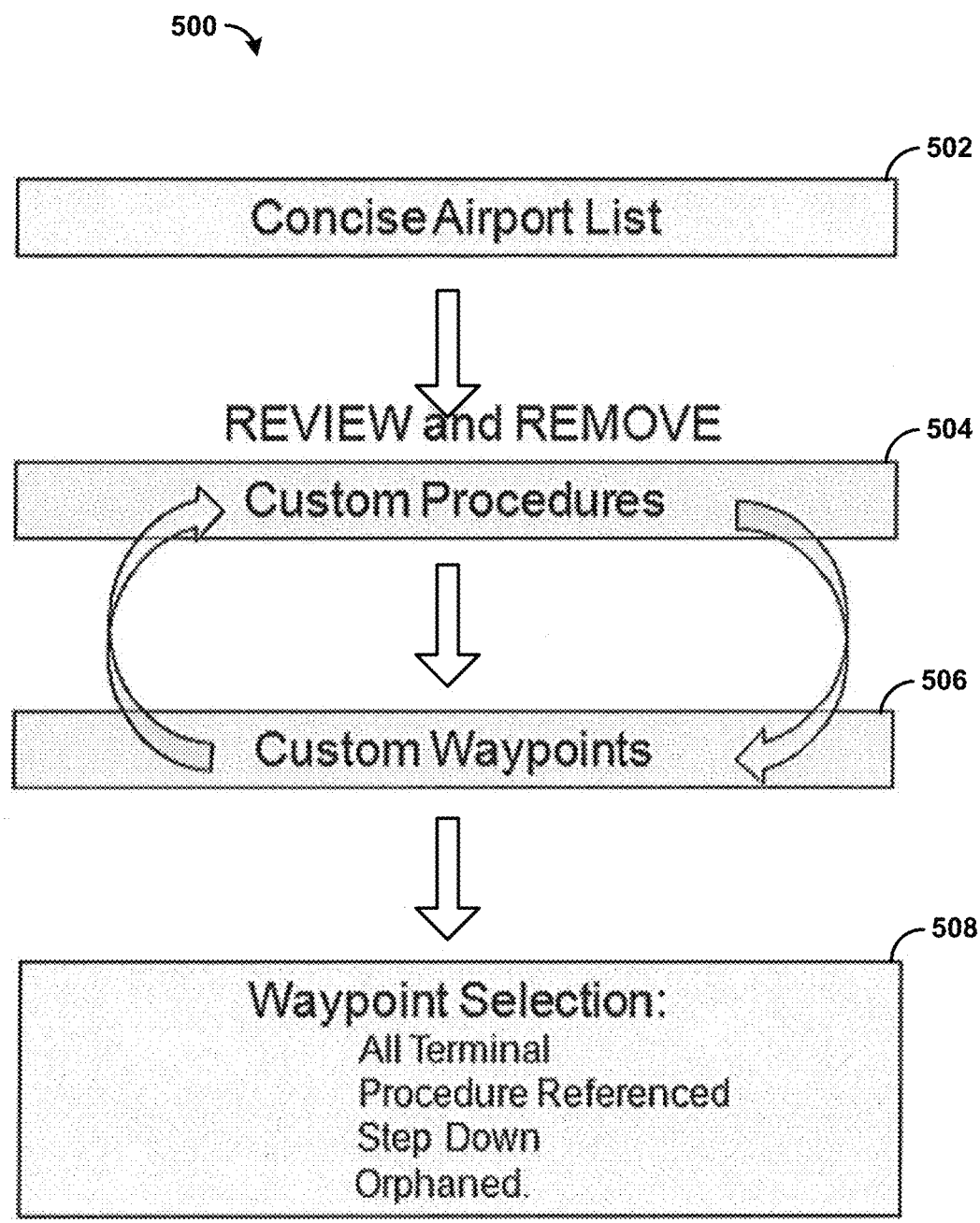
FIG. 5 is a flowchart illustrating a process for reviewing and refining a data structure.

FIG. 5 is a flowchart illustrating a process 500 for reviewing and refining a data structure. At step 502, a list of locations (e.g., airports) can be received. For example, a data structure can be generated. The data structure can be a database, data store, list, and/or the like. The locations can comprise ports (e.g., airports, harbors, stations), waypoints (e.g., points on a navigation route), refueling points, and/or the like.

At step 504, custom procedures associated with the locations can be reviewed and removed from the data structure. In one aspect, a review of the procedures associated with all these airports can be performed. Customized procedures can be assessed to determine the applicability, currency, and/or redundancy of the customized procedures. In one aspect, customized procedures can be removed and replaced with standard data. For example, RNAV visual flight procedures (RVFPs) associated with locations can be removed, especially if the RVFPs are associated with a location that is not associated with the first category. Other removals of data from the data structure can be performed on a gradual basis over successive data structure generation cycles. As the data is removed during each generation of the successive data structure, the impact on operation and management of the vehicle can be assessed.

At step 506, custom waypoints can be reviewed and removed. In one aspect, removal of custom waypoints can be performed on a gradual basis during several cycles of generating data structures. For example, custom waypoints can be ranked according to priority of keeping the custom waypoints in the data structure. The lowest priority custom waypoints can be removed before higher priority custom waypoints. As a further example, custom waypoints that are further from a navigational path and/or destination can be removed. Custom waypoints that are associated with alternate and/or emergency destinations can be removed. The custom waypoints can be removed gradually as a predefined amount of time or data structure build cycles pass since the custom waypoint was last relevant to (e.g., used in) the travel of the vehicle (e.g., airplane).

Figure 16A:
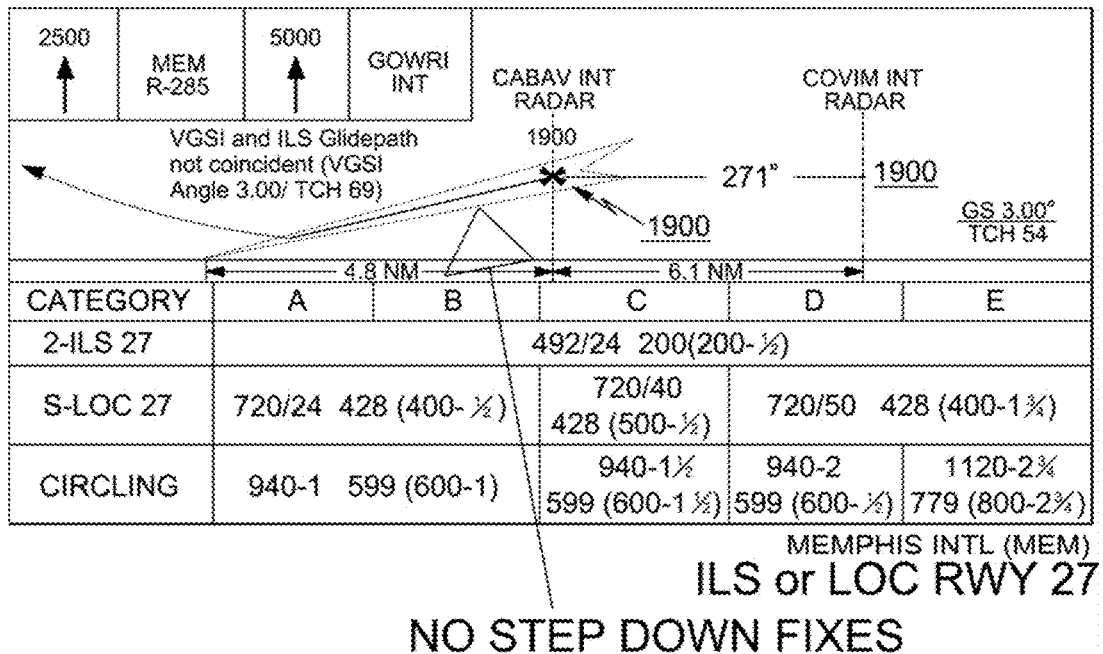
FIG. 16A is a diagram showing a vertical profile of an instrument approach with no step down fixes.
Figure 16B:
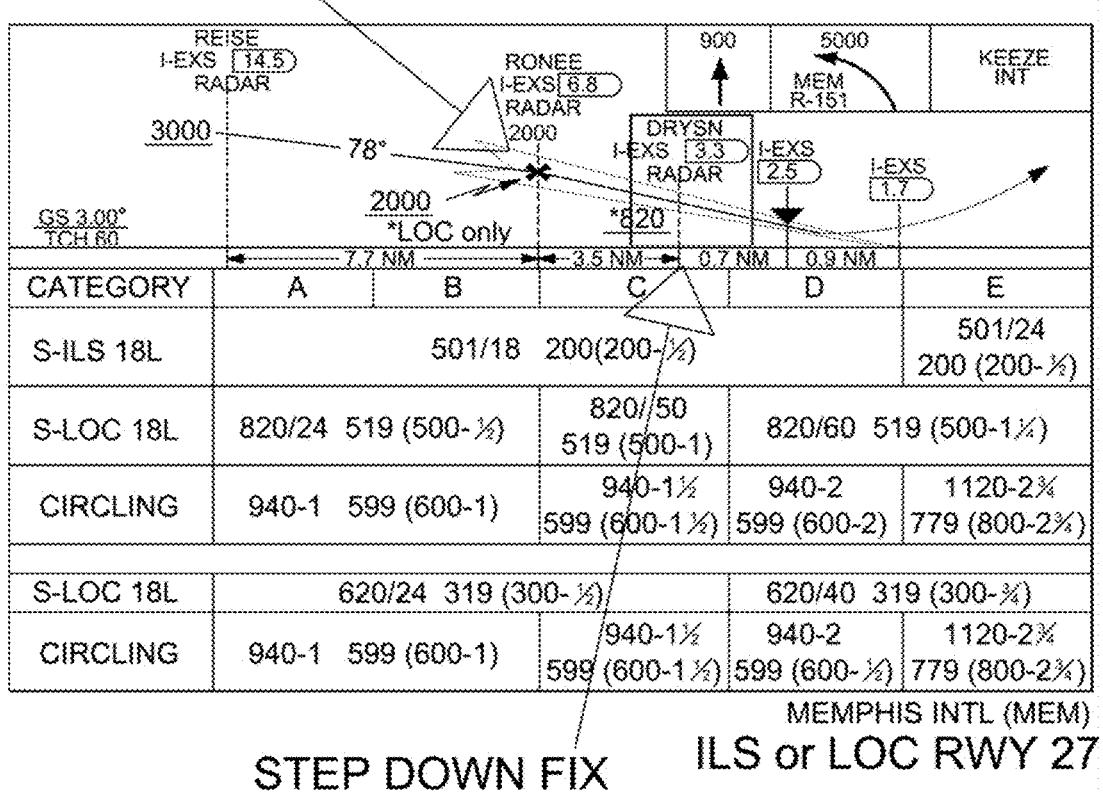
FIG. 16B is a diagram showing a vertical profile of an instrument approach with step down fixes.

At step 508, waypoints can be selected for inclusion and/or exclusion from the data. Waypoints can be selected based on search criteria. For example, waypoints can be excluded and/or included based on search criteria. In one aspect, waypoints can be included if the waypoint is included on an include list. For example, terminal waypoints can be selected. Terminal waypoints can be waypoints that are coded as related to a location, but not necessarily associated with a procedure. As a further example, terminal waypoints can comprise enroute waypoints and noncompulsory reporting points. In one aspect, procedure referenced waypoints can be selected. Procedure reference waypoints can be a subset of the terminal and enroute waypoints. Procedure referenced waypoints can comprise waypoints that are part of a named procedure. In another aspect, step down waypoints can be reviewed and removed. For example, a step down waypoint (e.g., step down fix) can be a named fix after a final approach fix (FAF). Step down waypoints may depend on FMC design. For example, some FMC may exclude step down waypoints (e.g., due to safety concerns). As an example, step down waypoints may not be included at all inside the final approach fix (FAF) but may allow FAF back to the Initial approach fix (IAF). As a further illustration, FIG. 16A is a diagram showing a vertical profile of an instrument approach with no step down fixes (e.g., step down waypoints). FIG. 16B is a diagram showing a vertical profile of an instrument approach with step down fixes (e.g. step down waypoints).

In a further aspect, orphaned waypoints can be selected. Orphaned waypoints can comprise waypoints that are not compulsory reporting points or can be referenced points derived from operational reports. These points can comprise an include list. Should a report of a needed waypoint be garnered from Dispatch or an Ops Report, consideration for inclusion into an Orphaned waypoint list can be recommended. By way of further explanation, some waypoints can be excluded from the data based on the search criteria. In some scenarios, a portion of the excluded waypoints may be later desired for inclusion in the data. For example, orphaned waypoints are waypoints previously excluded that were later found to be desired for inclusion in the data due to operational necessity. These orphaned waypoints can be added to a special list for inclusion (e.g., during each cycle in compiling a data structure). In one aspect, orphaned waypoints can be added based on an in-service report from a crew or dispatch. For example, a country (e.g., China) might label a waypoint as a significant terminal waypoint without associating the waypoint with any named procedure. Such waypoint may be excluded from a data structure of a vehicle based on the search criteria. Such exclusion may not be desirable because if a waypoint tends to be used by Air Traffic Control. Additionally, flight clearances may be commonly used with these waypoints. Thus, it can be desirable to include such waypoint on the orphaned waypoint list (e.g., include list). Data for such waypoint can be included in a data structure based on the orphaned waypoint list.

FIG. 6 is a diagram illustrating a data hierarchy for generating another data structure. After first obtaining a valid data structure (e.g., when the data structure is below an oversize threshold) analysis of remaining storage of a vehicle allows for additional features to be added and advanced techniques applied to optimize the contents of the subsequent data structures. For example, some locations associated with various categories can be associated with a different category. For example, a location associated with the second category can be associated with the third category instead of the second category. As another example, a location associated with the fourth category can be associated with the third category instead of the fourth category. Depending on how much storage remains below a threshold additional features may be added to the search criteria sent to the data provider. For example, the search criteria can be modified to select one or more HAR waypoints, FMS visuals, custom routes, and/or orphaned waypoints.

In one aspect, any upgrading of additional locations or special features added can be documented as post-baseline addendums. Accurate documentation not only keeps a record of validated contents but also enhances redaction options when active management thresholds are exceeded (e.g. 95%, 90% total capacity). In one aspect, managing the data structure contents can be a monthly event in line with the ARINC cycle. As subsequent data structures are generated, the following criteria can used: data structures should be near 90-95 percent (e.g., or lower) of storage capacity of the vehicle, custom data procedures can be avoided (e.g., deleted, purged), standard data can be prioritized over other data, and IAPs can be prioritized for inclusion over VGFP.

Figure 7:
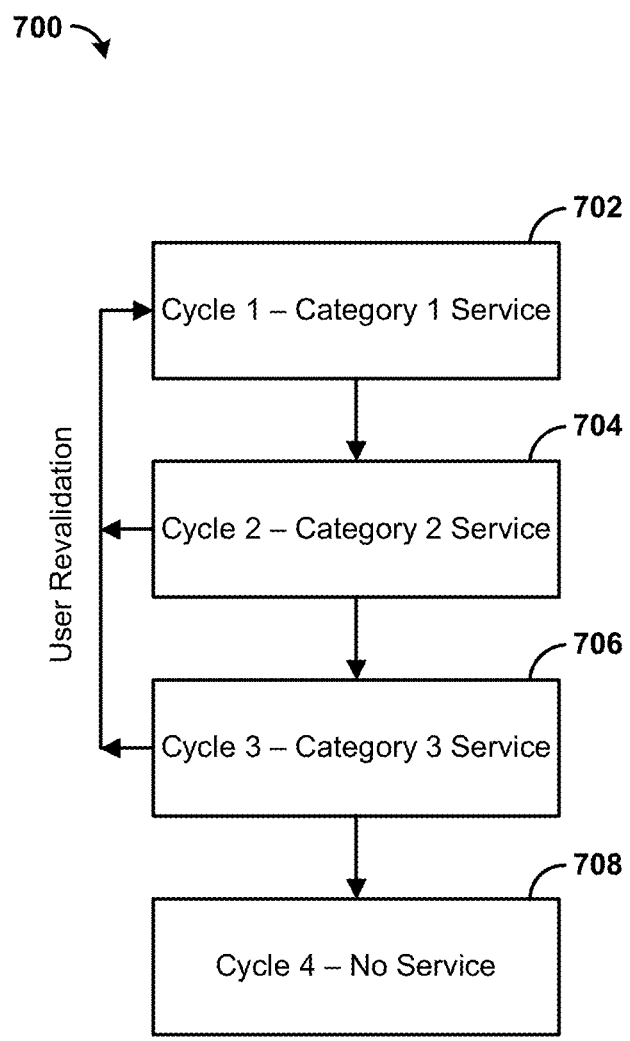
FIG. 7 is a flowchart illustrating a process for adding ad hoc locations to a data structure.

FIG. 7 is a flowchart illustrating a process 700 for adding ad hoc locations to a data structure. In some scenarios, a vehicle can be associated with a location on an ad hoc basis. For example, a vehicle can have a regular travel plan with routine destinations. An ad hoc location is a location that is added to the travel plan but may not be expected to be a location to which the vehicle travels in the future. If the ad hoc location is not currently in the data structure associated with a vehicle or location list used to select data structures, such location can be added to the data structure. Once the ad hoc location is categorized as a destination (e.g., first category or other category), then the ad hoc location and related data can be included in the data structure associated with a vehicle as long as the ad hoc location continues to be requested to be associated with the vehicle. If no longer requested, the location and its associated data can gradually be removed from the data structure. For example, if the location is not requested during a specified number of cycles (e.g., two cycles), the location can be removed. As shown in FIG. 7, if the location is revalidated (e.g., requested), the location can continue to be categorized under the first category during the next cycle of data generation. If the location is not revalidated, the ad hoc location can be categorized under another category (e.g., lower priority category), such as the third category.

In an aspect, the ad hoc location can be categorized under the first category during the first cycle 702. If the ad hoc location is not requested for the second cycle, then the ad hoc location can be categorized under the second location during the second cycle 704. If the ad hoc location is requested again for the second cycle, the ad hoc location can be categorized under the first category 702. If the ad hoc location is not requested for the third cycle, the ad hoc location can be categorized under the third category 706. If the ad hoc location is requested again after the third cycle, then the ad hoc location can be categorized again under the first category 702. If the ad hoc location continues to not be validated or requested after the third data cycle, then the ad hoc location and its associated data can be completely removed from the data in future data structure generation events, such as during a fourth cycle 704.

Figure 8:
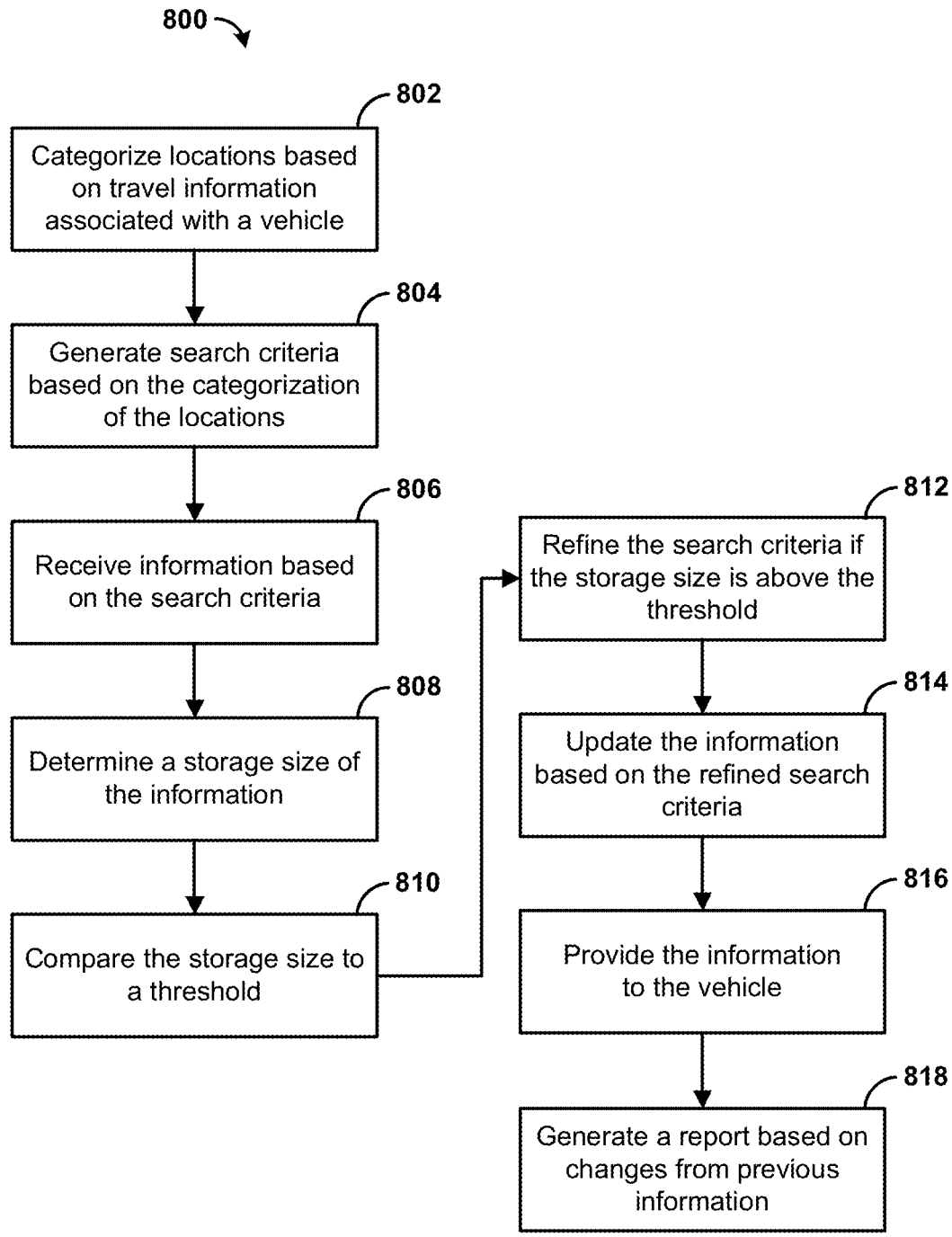
FIG. 8 is a flowchart illustrating an example method for optimizing data.

FIG. 8 is a flowchart illustrating an example method 800 for optimizing data. At step 802, locations can be categorized, based on travel information associated with a vehicle, according to at least one of a first category and a second category. For example, the first category can indicate planned destinations of the vehicle. The second category can indicate alternate destinations of the vehicle. In one aspect, the travel information can comprise at least one of a travel plan and a travel history of the vehicle. In another aspect, categorizing, based on travel information associated with the vehicle, locations according to at least one of a first category and a second category can further comprise categorizing locations according to a third category, fourth category, and/or additional categories.

At step 804, search criteria can be generated based on the categorization of the locations. For example, the search criteria can be configured to select first data for locations categorized with the first category and second data for locations categorized with the second category. In one aspect, the first data can be more detailed than the second data. For example, the first category can specify that certain data requested that is not specified by the second category.

At step 806, information based on the search criteria can be received. For example, the information can comprise a data structure, such as a database configured for a navigation system of the vehicle. The data structure can comprise first data for locations associated with the first category and second data for locations associated with the second category.

At step 808, a storage size of the information can be determined. For example, the storage size can determined based on the amount of hard disk space the information uses when stored on an intermediate device. For example, the data structure may be compressed and/or converted to another format when stored on the device. Accordingly, the storage size for the compressed and/or converted file can be determined.

At step 810, the storage size can be compared to a threshold. In one aspect, the threshold can be a threshold specific to the vehicle. For example, the threshold can be 85, 90, 95, or 100 percent of the storage space of a device, such as a navigation system of the vehicle. At step 812, the search criteria can be refined if the storage size is above the threshold. For example, new search criteria can be determined. In one aspect, the new search criteria can specify that certain types of data be excluded. For example, certain types of data can be excluded from one or more of the categories.

At step 814, the information can be updated based on the refined search criteria. For example, a new data structure can be generated based on the refined data structure, and the new data structure can comprise an updated version of the first data and second data. The new data structure can comprise more or less information, different information, and/or the like from the data structure.

At step 816, the information can be provided to the vehicle. In one aspect, providing the information to the vehicle can comprise uploading the information to a navigational database of a vehicle. For example, the vehicle can comprise an aircraft. For example, the information can be converted to a navigational database file. The information can be uploaded via a network connection, USB stick, direct connection, diskette, and/or the like.

At step 818, a report can be generated based on changes from previous information to the information. The report can be generated at the vehicle, at a station and provided to the vehicle, and/or the like. For example, the report can indicate changes in duties for an agent associated with the vehicle. For example, the agent can be at least one of a pilot associated with the vehicle and a dispatcher associated with the vehicle.

Figure 9:
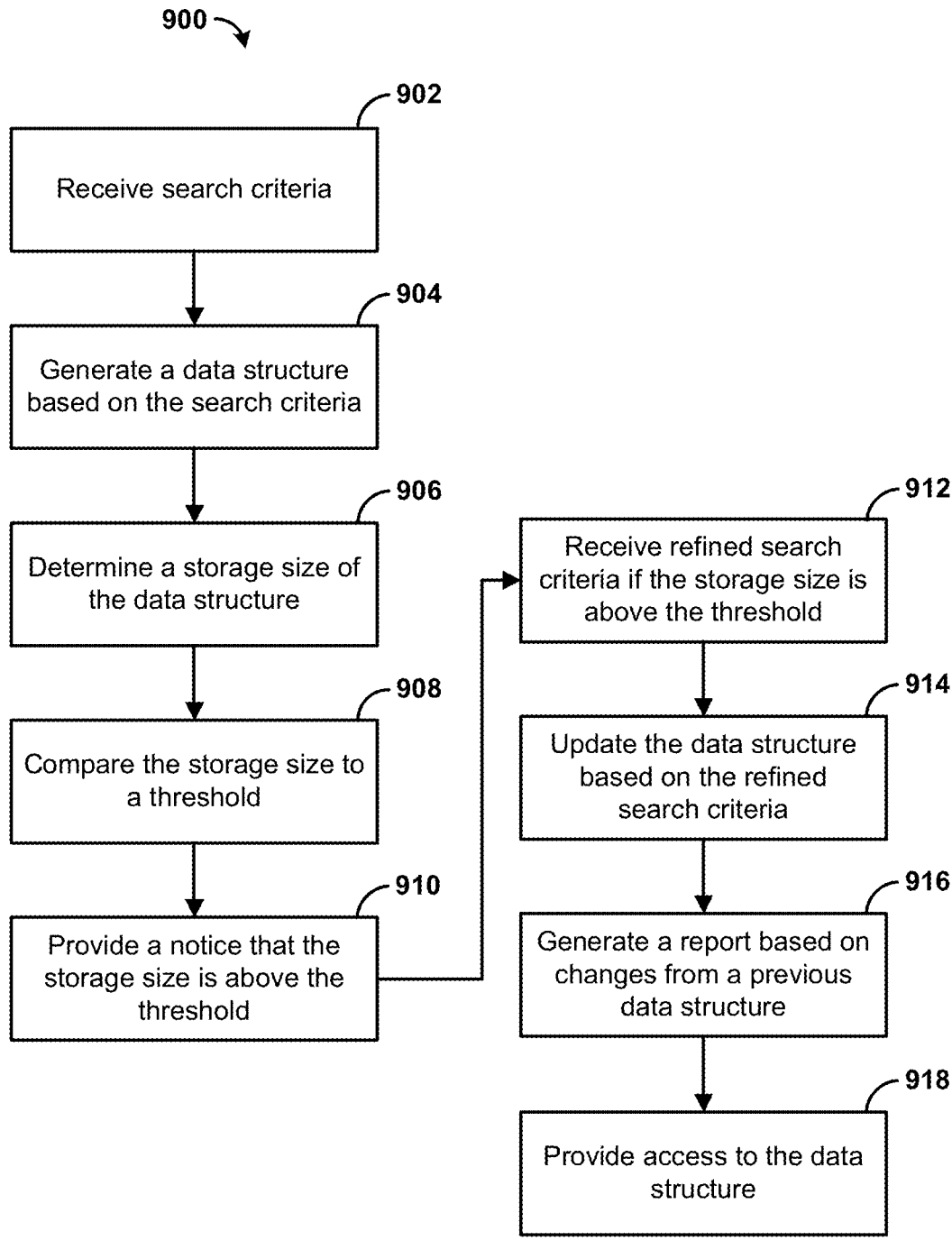
FIG. 9 is a flowchart illustrating another example method for optimizing data.

FIG. 9 is a flowchart illustrating another example method 900 for optimizing data. At step 902, search criteria (e.g., search criteria shown in Table 1, Table 2, and/or Table 3 or otherwise described herein) can be received. In one aspect, the search criteria can be configured to select first data for locations associated with a first category and second data for locations associated with a second category. In one aspect, the first data can be more detailed than the second data. In another aspect, the first locations can associated with the first category based on travel information of the vehicle. The second locations can be associated with the second category based on the travel information of the vehicle. In one aspect, the search criteria can be further configured to select third data for locations associated with a third category, fourth category, or other categories. The third category can indicate emergency destinations of the vehicle. In one aspect, the travel information can comprises at least one of a travel plan and a travel history of the vehicle. As an illustration, the first category can indicate planned destinations of the vehicle and the second category can indicate alternate destinations of the vehicle. In one aspect, the vehicle can comprise an aircraft.

At step 904, a data structure can be generated based on the search criteria. In one aspect, generating the data structure based on the search criteria comprises generating the data structure in a format suitable for a navigational system and associated navigation database of the vehicle. For example, the data structure can be formatted for an electronic flight bag, flight navigational system, and/or the like. The data structure can be formatted according to parameters. For example, the parameters can be indicative of a type of data structure, such as a type of database. The parameters can be indicative of a device, such as a vehicle, on which the data structure is intended to be stored. In another aspect, the data structure can be converted from an ARINC 424 standard data file to a navigation database file of a flight management system of a vehicle.

At step 906, a storage size of the data structure can be determined. For example, the storage size can determined based on the amount of hard disk space the information uses when stored on a device. For example, the hard disk can be analyzed to determine capacity of the hard disk, space used by the data structure, and/or the like. For example, the data structure may be compressed and/or converted to another format when stored on the device. Accordingly, the storage size for the compressed and/or converted file can be determined.

At step 908, the storage size can be compared to a threshold. In one aspect, the threshold can be a threshold specific to the vehicle. For example, the threshold can be 85, 90, 95, or 100 percent of the storage space of a device, such as a navigation system of the vehicle. Additionally, the storage size can be compared to multiple thresholds. The thresholds can be associated with vary levels of notifications, warnings, corrective procedures, and/or the like.

At step 910, a notice that the storage size is above the threshold can be provided. For example, the notice can be provided to a management device used to manage a fleet of vehicles. The notice can be provided as a message (e.g., pop-up message), electronic notification, email, audible alert, and/or the like. For example, the notice can be transmitted across a network.

At step 912, refined search criteria can be received if the storage size is above the threshold. For example, new search criteria can be received (e.g., search criteria shown in Table 1, Table 2, and/or Table 3 or otherwise described herein). The new search criteria can be received from a user. In one aspect, the new search criteria can specify that certain types of data be excluded. For example, certain types of data can be excluded from one or more of the categories. For example, waypoints, procedures, locations, and/or the like for certain categories can be excluded.

At step 914, the data structure can be updated based on the refined search criteria. For example, a new data structure can be generated based on the refined data structure, and the new data structure can comprise an updated version of the data structure. The new data structure can comprise more or less information, different information, and/or the like from the data structure.

At step 916, a report can be generated based on changes from a previous data structure to the data structure. The report can be generated at the vehicle, at a station and provided to the vehicle, and/or the like. In one aspect, the report can indicate changes in duties for an agent associated with the vehicle. For example, the agent can be at least one of a pilot associated with the vehicle and a dispatcher associated with the vehicle.

At step 918, access can be provided to the data structure. In one aspect, providing access to the data structure can comprise providing a server comprising the data structure. For example, the server can comprise a file transfer protocol server. The data structure can be downloaded from the service and uploaded on to the hard disk of the vehicle.

Figure 10:
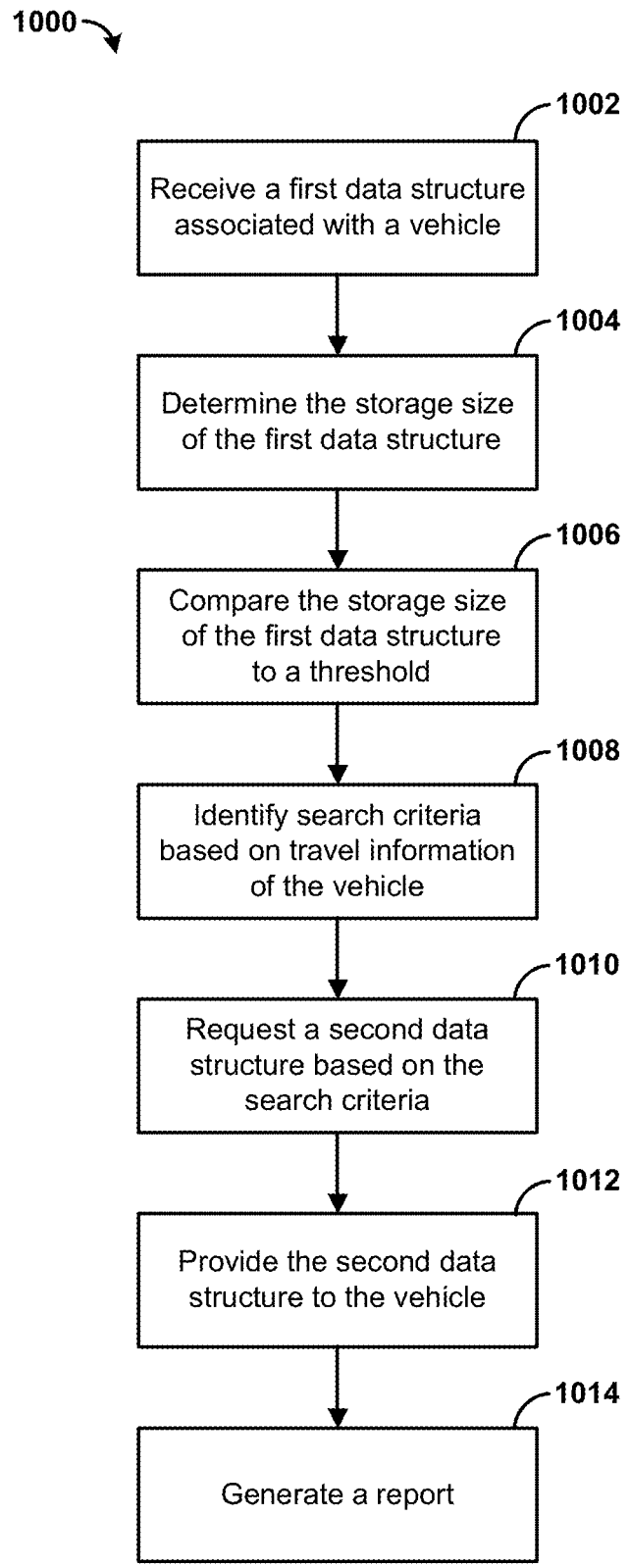
FIG. 10 is a flowchart illustrating yet another example method for optimizing data.

FIG. 10 is a flowchart illustrating yet another example method 1000 for optimizing data. At step 1002, a first data structure associated with a vehicle can be received. The first data structure can be received from the vehicle, a device configured to generate the first data structure, and/or the like. In one aspect, the vehicle can comprise an aircraft, boat, car, and/or the like. For example, the first data structure can be a data structure configured to assist a navigational system of the vehicle. For example, the data structure can be a navigational database file.

At step 1004, the storage size of the first data structure can be determined. For example, the storage size can determined based on the amount of hard disk space the information uses when stored on a device. For example, the data structure may be compressed and/or converted to another format when stored on the device. Accordingly, the storage size for the compressed and/or converted file can be determined.

At step 1006, the storage size of the first data structure can be compared to a threshold. In one aspect, the threshold can be a threshold specific to the vehicle. For example, the threshold can be 85, 90, 95, or 100 percent of the storage space of a device, such as a navigation system of the vehicle. Additionally, the storage size can be compared to multiple thresholds. The thresholds can be associated with varying levels of notifications, warnings, corrective procedures, and/or the like.

At step 1008, search criteria can be identified based on travel information of the vehicle. In one aspect, the travel information can comprise at least one of a travel plan and a travel history of the vehicle. The search criteria can also be identified based on the comparison to the threshold. In one aspect, identifying search criteria based on the travel information of the vehicle and the comparison to the threshold can comprise categorizing, based on the travel information associated with the vehicle, first locations according to at least one of a first category and a second category. The first category can indicate planned destinations of the vehicle. The second category can indicate alternate destinations of the vehicle. In another aspect, identifying search criteria based on the travel information of the vehicle and the comparison to the threshold further can comprise categorizing second locations according to a third category, fourth category, or other category. The third category can indicate emergency destinations of the vehicle.

At step 1010, a second data structure associated with the vehicle can be requested based on the search criteria. For example, the second data structure can be requested from a data supplier. The second data structure can comprise locations selected from a database of locations. The second data structure can comprise data associated with the selected locations. For example, the second data structure can comprise procedures (e.g., flight procedures), waypoints, locations, navigational paths, and/or the like.

At step 1012, the second data structure can be provided to the vehicle. In one aspect, providing the second data structure to the vehicle can comprise uploading the second data structure to a navigational database of a vehicle. For example, the second data structure can be converted to a navigational database file. The second data structure can be uploaded via a network connection, USB stick, direct connection, diskette, and/or the like.

At step 1014, a report can be generated. The report can be generated at the vehicle, at a station and provided to the vehicle, and/or the like. For example, the report can be generated based on changes from the first data structure to the second data structure. The report can indicate changes in duties for an agent associated with the vehicle. The example, the agent can be at least one of a pilot associated with the vehicle and a dispatcher associated with the vehicle.

Figure 11:
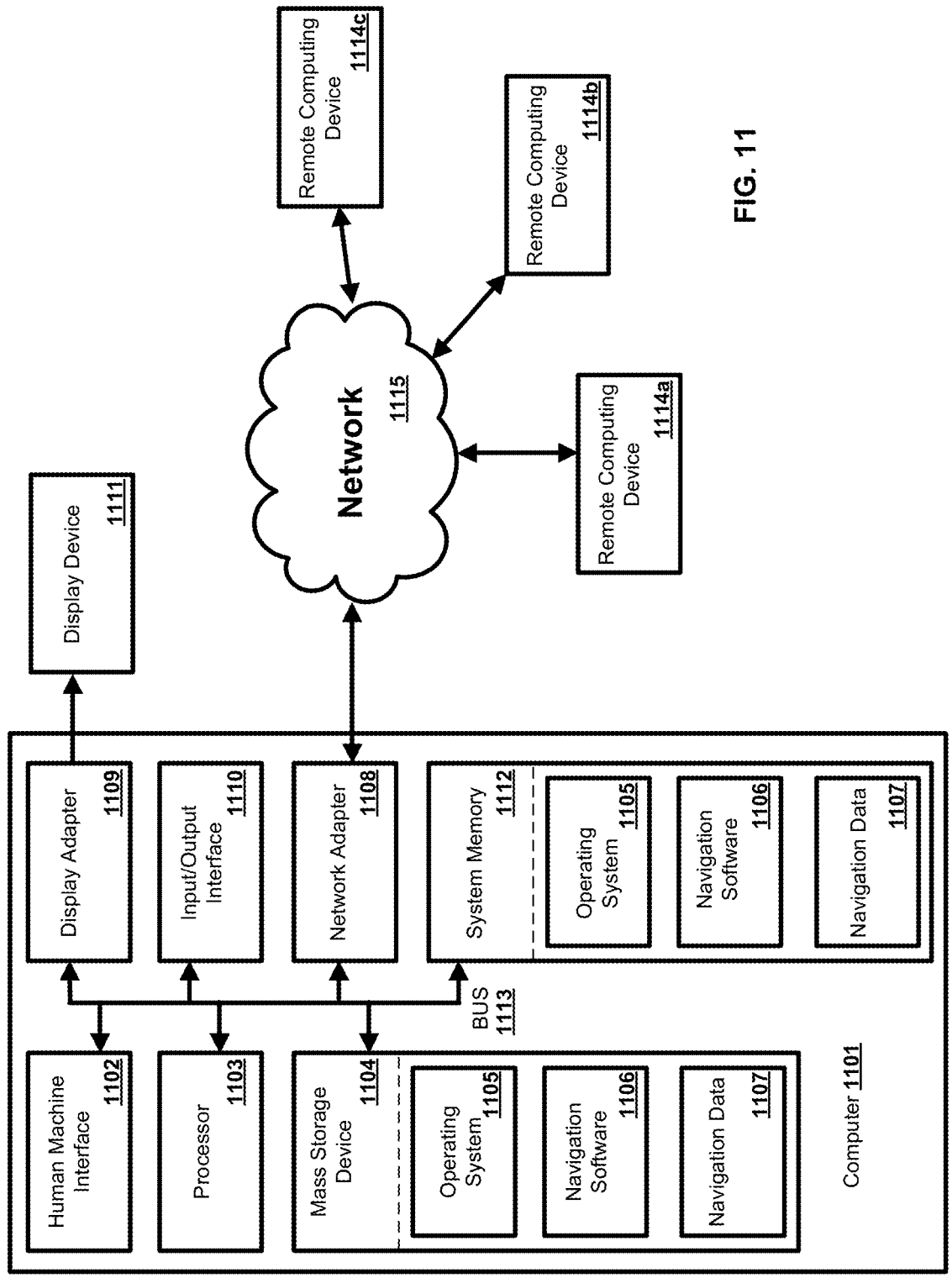
FIG. 11 is a block diagram illustrating an example computing system in which the present methods and systems can operate.

In an exemplary aspect, the methods and systems can be implemented on a computer 1101 as illustrated in FIG. 11 and described below. By way of example, the first device 102, second device 108, data station 126, and vehicles 110 of FIG. 1 can each be a computer as illustrated in FIG. 11. Similarly, the methods and systems disclosed can utilize one or more computers to perform one or more functions in one or more locations. FIG. 11 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1101. The components of the computer 1101 can comprise, but are not limited to, one or more processors or processing units 1103, a system memory 1112, and a system bus 1113 that couples various system components including the processor 1103 to the system memory 1112. In the case of multiple processing units 1103, the system can utilize parallel computing.

The system bus 1113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1113, and all buses specified in this description can also be implemented over a wired or wireless network connection and each of the subsystems, including the processor 1103, a mass storage device 1104, an operating system 1105, navigation software 1106, navigation data 1107, a network adapter 1108, system memory 1112, an Input/Output Interface 1110, a display adapter 1109, a display device 1111, and a human machine interface 1102, can be contained within one or more remote computing devices 1114*a,b,c* at physically separate locations, connected through buses of this form, in effect implementing a fully distributed system.

The computer 1101 typically comprises a variety of computer readable media. Exemplary readable media can be any available media that is accessible by the computer 1101 and comprises, for example and not meant to be limiting, both volatile and non-volatile media, removable and non-removable media. The system memory 1112 comprises computer readable media in the form of volatile memory, such as random access memory (RAM), and/or non-volatile memory, such as read only memory (ROM). The system memory 1112 typically contains data such as navigation data 1107 and/or program modules such as operating system 1105 and navigation software 1106 that are immediately accessible to and/or are presently operated on by the processing unit 1103.

In another aspect, the computer 1101 can also comprise other removable/non-removable, volatile/non-volatile computer storage media. By way of example, FIG. 11 illustrates a mass storage device 1104 which can provide non-volatile storage of computer code, computer readable instructions, data structures, program modules, and other data for the computer 1101. For example and not meant to be limiting, a mass storage device 1104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, including by way of example, an operating system 1105 and navigation software 1106. Each of the operating system 1105 and navigation software 1106 (or some combination thereof) can comprise elements of the programming and the navigation software 1106. Navigation data 1107 can also be stored on the mass storage device 1104. Navigation data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1103 via a human machine interface 1102 that is coupled to the system bus 1113, but can be connected by other interface and bus structures, such as a parallel port, game port, an IEEE 1394 Port (also known as a Firewire port), a serial port, or a universal serial bus (USB).

In yet another aspect, a display device 1111 can also be connected to the system bus 1113 via an interface, such as a display adapter 1109. It is contemplated that the computer 1101 can have more than one display adapter 1109 and the computer 1101 can have more than one display device 1111. For example, a display device can be a monitor, an LCD (Liquid Crystal Display), or a projector. In addition to the display device 1111, other output peripheral devices can comprise components such as speakers (not shown) and a printer (not shown) which can be connected to the computer 1101 via Input/Output Interface 1110. Any step and/or result of the methods can be output in any form to an output device. Such output can be any form of visual representation, including, but not limited to, textual, graphical, animation, audio, tactile, and the like. The display 1111 and computer 1101 can be part of one device, or separate devices.

The computer 1101 can operate in a networked environment using logical connections to one or more remote computing devices 1114a,b,c. By way of example, a remote computing device can be a personal computer, portable computer, smartphone, a server, a router, a network computer, a peer device or other common network node, and so on. Logical connections between the computer 1101 and a remote computing device 1114a,b,c can be made via a network 1115, such as a local area network (LAN) and/or a general wide area network (WAN). Such network connections can be through a network adapter 1108. A network adapter 1108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1105 are illustrated herein as discrete blocks, although it is recognized that such programs and components reside at various times in different storage components of the computing device 1101, and are executed by the data processor(s) of the computer. An implementation of navigation software 1106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
generating a first search criteria configured to select one or more of first data for locations categorized within a first category or second data for locations categorized within a second category;
receiving, based on the first search criteria, information for a vehicle;
comparing a storage size of the information to a threshold;
generating, based on the storage size of the information satisfying the threshold, a second search criteria configured to select the one or more of the first data for locations categorized with the first category or the second data for locations categorized with the second category; and
receiving, based on the second search criteria, second information.

2. The method of claim 1, further comprising providing, based on the second search criteria, the second information to the vehicle.

3. The method of claim 2, wherein providing the second information to the vehicle comprises uploading the second information to a navigational database associated with the vehicle.

4. The method of claim 1, wherein the second search criteria specifies at least a portion of the information to be excluded from one or more of the first category or the second category.

5. The method of claim 4, wherein the at least the portion of the information to be excluded comprises a particular type of data.

6. The method of claim 1, wherein the second search criteria is configured to remove a portion of data from the information.

7. The method of claim 1, wherein the vehicle is an aircraft.

8. The method of claim 1, wherein the threshold is associated with a storage capacity for the vehicle.

9. The method of claim 1, wherein the first category indicates one or more planned destinations of the vehicle and the second category indicates one or more alternate destinations of the vehicle.

10. The method of claim 1, further comprising:
categorizing, based on travel information associated with the vehicle, a plurality of locations according to one or more of the first category or the second category.

11. The method of claim 10, wherein categorizing, based on the travel information, the plurality of locations according to one or more of the first category or the second category further comprises categorizing the plurality of locations according to a third category.

12. The method of claim 1, wherein the second information is smaller than the information.

13. The method of claim 1, further comprising determining travel information identifying at least a plurality of locations comprising a travel history associated with the vehicle.

14. A method comprising:
  generating, based on a first search criteria, a first data structure associated with a vehicle;
  determining that a storage size of the first data structure satisfies a threshold;
  identifying, based on determining that the storage size of the first data structure satisfies the threshold, a second search criteria;
  generating, based on the second search criteria, a second data structure, wherein the second data structure is smaller than the first data structure; and
  providing the second data structure to the vehicle.

15. The method of claim 14, wherein the vehicle is an aircraft and wherein providing the second data structure to the vehicle comprises uploading the second data structure to a navigational database associated with the aircraft.

16. The method of claim 14, wherein identifying the second search criteria comprises categorizing, based on travel information, first locations according to at least one of a first category or a second category.

17. The method of claim 14, further comprising generating a report based on changes from the first data structure to the second data structure.

18. A method comprising:
  receiving, based on a first search criteria, information comprising one or more of first data for locations categorized within a first category or second data for locations categorized within a second category;
  comparing a storage size of the information to a threshold;
  generating, based on the storage size of the information satisfying the threshold, second search criteria configured to select the one or more of the first data for the locations categorized with the first category or second data for the locations categorized with the second category;
  receiving, based on the second search criteria, second information; and
  providing, based on the second search criteria, the second information to a navigational database of a vehicle.

19. The method of claim 18, wherein the second search criteria is configured to remove a portion of data from the information and wherein the second search criteria specifies a particular data type of the information to be excluded from one or more of the first category or the second category.

20. The method of claim 18, wherein the threshold is associated with a data storage capacity for a portion of the vehicle.

* * * * *